US009835778B1

(12) United States Patent
Xing et al.

(10) Patent No.: US 9,835,778 B1
(45) Date of Patent: Dec. 5, 2017

(54) APPARATUS AND METHOD FOR A DIAMOND SUBSTRATE FOR A MULTI-LAYERED DIELECTRIC DIFFRACTION GRATING

(71) Applicant: Lockheed Martin Corporation, Bethesda, MD (US)

(72) Inventors: Andrew Xing, Bothell, WA (US); Eric C. Honea, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 605 days.

(21) Appl. No.: 14/121,004

(22) Filed: Sep. 15, 2014

Related U.S. Application Data

(60) Provisional application No. 61/877,796, filed on Sep. 13, 2013.

(51) Int. Cl.
*G02B 5/18* (2006.01)

(52) U.S. Cl.
CPC .......... *G02B 5/1861* (2013.01); *G02B 5/1847* (2013.01)

(58) Field of Classification Search
CPC ....... G02B 5/18; G02B 5/1847; G02B 5/1861
See application file for complete search history.

(56) References Cited

U.S. PATENT DOCUMENTS

| 3,476,463 | A | 11/1969 | Kreuzer |
| 3,825,319 | A | 7/1974 | Cook et al. |
| 4,200,846 | A | 4/1980 | Stark et al. |
| 4,367,040 | A | 1/1983 | Goto |
| 4,904,043 | A | 2/1990 | Schweizer |
| 5,046,810 | A | 9/1991 | Steiner et al. |
| 5,243,448 | A | 9/1993 | Banbury |
| 5,319,668 | A | 6/1994 | Luecke |
| 5,319,729 | A | 6/1994 | Allen et al. |

(Continued)

FOREIGN PATENT DOCUMENTS

| JP | 06235806 A | * | 8/1994 |
| WO | WO 2013062584 | | 5/2013 |

OTHER PUBLICATIONS

Perry et al., "High-efficiency multilayer dielectric diffraction gratings", Optics Letters, vol. 20, No. 8, pp. 940-942, (Apr. 15, 1995).*

(Continued)

*Primary Examiner* — Eric Bolda
(74) *Attorney, Agent, or Firm* — Charles A. Lemaire; Jonathan M. Rixen; Lemaire Patent Law Firm, P.L.L.C.

(57) ABSTRACT

The present invention provides a method and apparatus for fabricating a grating on a silicon substrate, and the resulting grating device. In some embodiments, the apparatus method includes providing a silicon substrate; growing a diamond layer on the substrate; removing most of the silicon substrate and polishing an obverse face of the silicon to leave a very thin layer of polished silicon on the diamond layer; depositing a stack on the diamond layer, wherein the stack includes a plurality of pairs of dielectric layers on the thin layer of polished silicon, wherein each pair of the plurality of pairs of dielectric layers includes a first layer having a first index of refraction value and a second layer having a second index of refraction value that is different than the first index of refraction value; and forming a diffraction grating on an outer surface of the stack.

20 Claims, 10 Drawing Sheets

(56) References Cited

U.S. PATENT DOCUMENTS

| | | |
|---|---|---|
| 5,346,583 A | 9/1994 | Basavanhally |
| 5,379,310 A | 1/1995 | Papen et al. |
| 5,440,416 A | 8/1995 | Cohen et al. |
| 5,526,155 A | 6/1996 | Knox et al. |
| 5,608,826 A | 3/1997 | Boord et al. |
| 5,907,436 A | 5/1999 | Perry et al. |
| 5,912,910 A | 6/1999 | Sanders et al. |
| 5,974,060 A | 10/1999 | Byren et al. |
| 5,991,068 A | 11/1999 | Massicott et al. |
| 6,023,361 A | 2/2000 | Ford |
| 6,028,879 A | 2/2000 | Ershov |
| 6,212,310 B1 | 4/2001 | Waarts et al. |
| 6,275,623 B1 | 8/2001 | Brophy et al. |
| 6,304,694 B1 | 10/2001 | Ford |
| 6,339,662 B1 | 1/2002 | Koteles et al. |
| 6,356,385 B1 | 3/2002 | Digonnet et al. |
| 6,381,008 B1 | 4/2002 | Branagh et al. |
| 6,381,388 B1 | 4/2002 | Epworth et al. |
| 6,407,855 B1 | 6/2002 | MacCormack et al. |
| 6,424,456 B1 | 7/2002 | Lee et al. |
| 6,437,906 B1 | 8/2002 | Di Pasquale et al. |
| 6,456,756 B1 | 9/2002 | Mead |
| 6,523,985 B2 | 2/2003 | Hamanaka et al. |
| 6,563,975 B2 | 5/2003 | Towery |
| 6,643,068 B2 | 11/2003 | Mandella |
| 6,665,471 B1 | 12/2003 | Farmer et al. |
| 6,696,142 B2 | 2/2004 | Baer et al. |
| 6,754,006 B2 | 6/2004 | Barton et al. |
| 6,765,724 B1 | 7/2004 | Kramer |
| 6,766,076 B2 | 7/2004 | Nakama et al. |
| 6,807,338 B2 | 10/2004 | Bouteiller et al. |
| 6,819,871 B1 | 11/2004 | Baldwin et al. |
| 6,820,445 B2 | 11/2004 | Gratrix |
| 6,822,796 B2 | 11/2004 | Takada et al. |
| 6,830,813 B2 | 12/2004 | Ravi |
| 6,836,602 B2 | 12/2004 | Filhaber et al. |
| 6,865,344 B1 | 3/2005 | Johnson et al. |
| 6,912,091 B2 | 6/2005 | Hamanaka et al. |
| 6,914,916 B2 | 7/2005 | Pezeshki et al. |
| 6,931,177 B2 | 8/2005 | Suzuki et al. |
| 6,937,795 B2 | 8/2005 | Squires et al. |
| 6,952,510 B1 | 10/2005 | Karlsen et al. |
| 6,958,859 B2 | 10/2005 | Hoose et al. |
| 6,961,356 B2 | 11/2005 | Brown |
| 6,980,717 B2 | 12/2005 | Watanabe et al. |
| 6,996,343 B2 | 2/2006 | Neilson |
| 7,042,916 B2 | 5/2006 | Borne et al. |
| 7,065,107 B2 | 6/2006 | Hamilton et al. |
| 7,142,757 B1 | 11/2006 | Ward |
| 7,199,924 B1 | 4/2007 | Brown et al. |
| 7,228,033 B2 | 6/2007 | Bhagavatula et al. |
| 7,233,442 B1 | 6/2007 | Brown et al. |
| 7,283,702 B2 | 10/2007 | Brosnan et al. |
| 7,346,236 B2 | 3/2008 | Asano et al. |
| 7,349,589 B2 | 3/2008 | Temelkuran et al. |
| 7,391,561 B2 | 6/2008 | Di Teodoro et al. |
| 7,424,183 B2 | 9/2008 | Akashi et al. |
| 7,430,352 B2 | 9/2008 | Di Teodoro et al. |
| 7,436,588 B2 | 10/2008 | Rothenberg et al. |
| 7,477,666 B2 | 1/2009 | Liu |
| 7,501,330 B2 | 3/2009 | Ravi et al. |
| 7,557,986 B2 | 7/2009 | Sintov |
| 7,570,856 B1 | 8/2009 | Minelly |
| 7,634,163 B2 | 12/2009 | Moy et al. |
| 7,768,700 B1 | 8/2010 | Savage-Leuchs |
| 7,787,729 B2 | 8/2010 | Dong et al. |
| 7,846,767 B1 | 12/2010 | Sung |
| 7,876,498 B1 | 1/2011 | Honea et al. |
| 7,876,803 B1 | 1/2011 | Di Teodoro et al. |
| 7,924,500 B1 | 4/2011 | Minelly |
| 8,094,689 B1 | 1/2012 | Koplow |
| 8,179,594 B1 | 5/2012 | Tidwell |
| 8,199,399 B1 | 6/2012 | Savage-Leuchs |
| 8,236,594 B2 | 8/2012 | Sung |
| 8,335,420 B2 | 12/2012 | Beach et al. |
| 8,351,111 B2 | 1/2013 | DiGiovanni et al. |
| 8,355,608 B2 | 1/2013 | Hu |
| 8,411,712 B2 | 4/2013 | Honea et al. |
| 8,441,718 B2 | 5/2013 | Mead |
| 8,493,651 B1 | 7/2013 | Hu et al. |
| 8,503,840 B2 | 8/2013 | Hu et al. |
| 8,526,110 B1 | 9/2013 | Honea et al. |
| 8,724,207 B1 * | 5/2014 | Andrusyak ........... H01S 3/0057 359/264 |
| 8,736,953 B2 | 5/2014 | Savage-Leuchs |
| 8,755,649 B2 | 6/2014 | Yilmaz et al. |
| 8,767,286 B2 | 7/2014 | Savage-Leuchs |
| 8,830,568 B2 | 9/2014 | Savage-Leuchs |
| 8,903,209 B2 | 12/2014 | Cheung et al. |
| 2002/0181856 A1 | 12/2002 | Sappey et al. |
| 2003/0091263 A1 * | 5/2003 | Yoneda ................ G02B 6/1203 385/14 |
| 2003/0231829 A1 | 12/2003 | Meyers et al. |
| 2004/0170356 A1 * | 9/2004 | Iazikov .................. G02B 5/203 385/37 |
| 2006/0113545 A1 | 6/2006 | Weber et al. |
| 2006/0233554 A1 | 10/2006 | Ramachandran et al. |
| 2008/0285101 A1 * | 11/2008 | Shiraishi .................. B41J 2/471 359/198.1 |
| 2009/0103874 A1 | 4/2009 | Broeng et al. |
| 2011/0188118 A1 * | 8/2011 | Kley .................... G02B 5/1814 359/558 |
| 2013/0322470 A1 | 12/2013 | Creeden et al. |
| 2015/0029589 A1 * | 1/2015 | Neauport ............... G02B 1/105 359/572 |
| 2015/0104180 A1 * | 4/2015 | Zimer ................... H04B 10/572 398/95 |
| 2015/0138630 A1 | 5/2015 | Honea et al. |

OTHER PUBLICATIONS

Yahel, et al., "Transient Analysis of Short, High-Concentration, Gain-Clamped Er3+—Yb3+ Codoped Fiber Amplifiers", "Journal of Lightwave Technology", May 2006, pp. 2190-2198, vol. 24, No. 5.

* cited by examiner

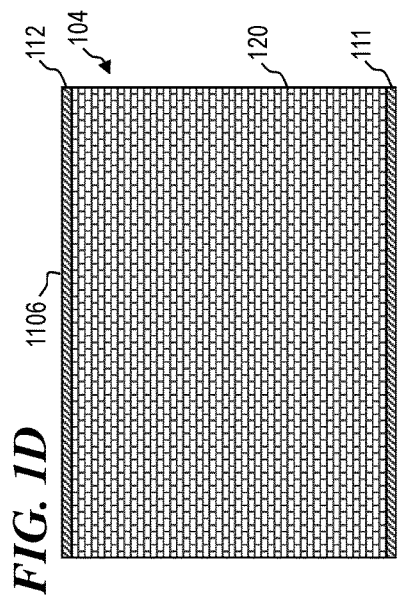
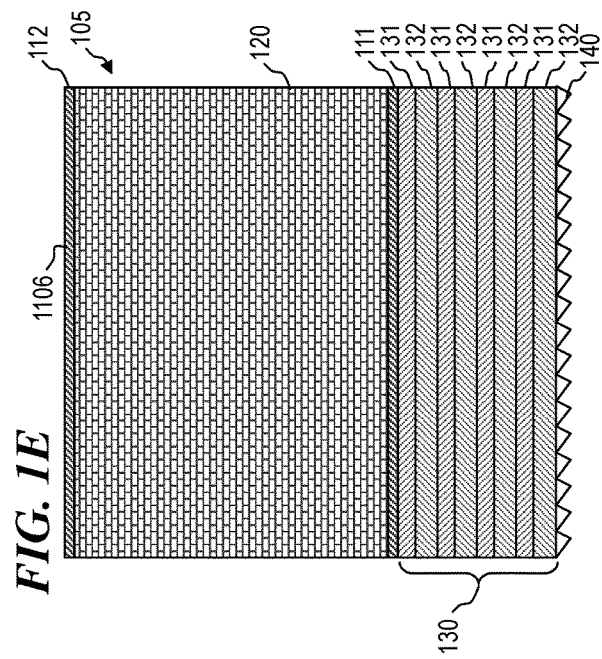
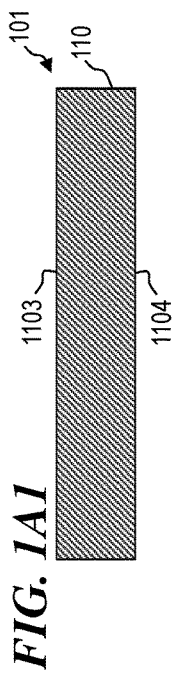
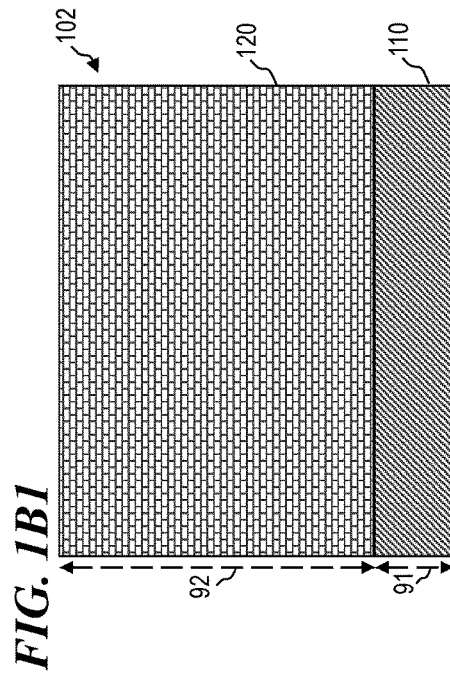
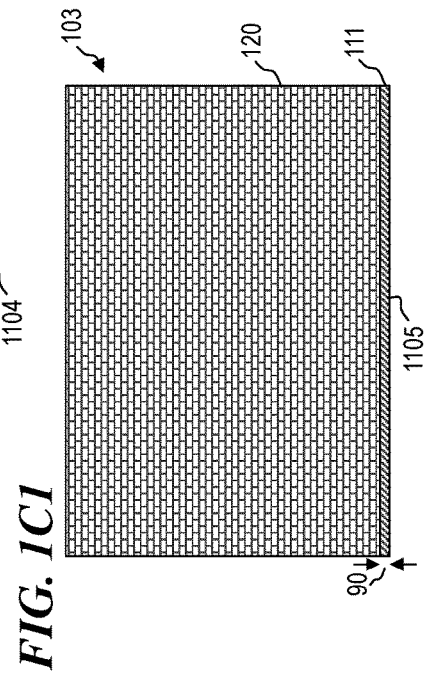

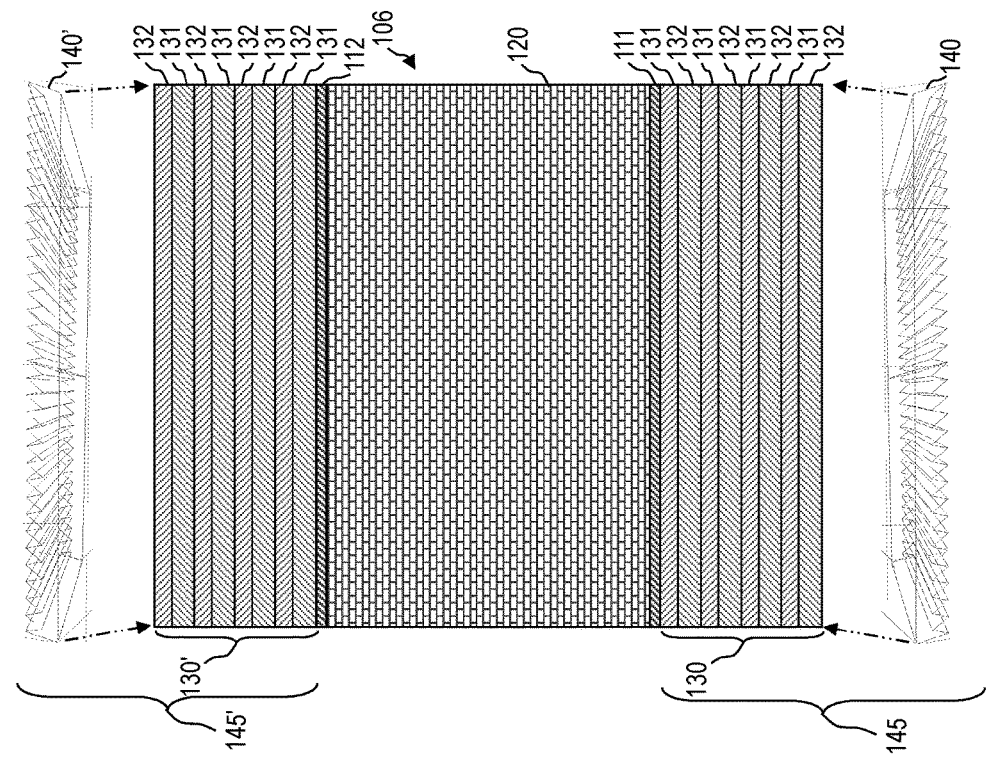
FIG. 1F
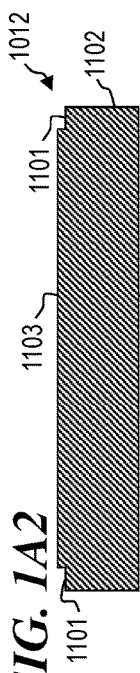
FIG. 1A2
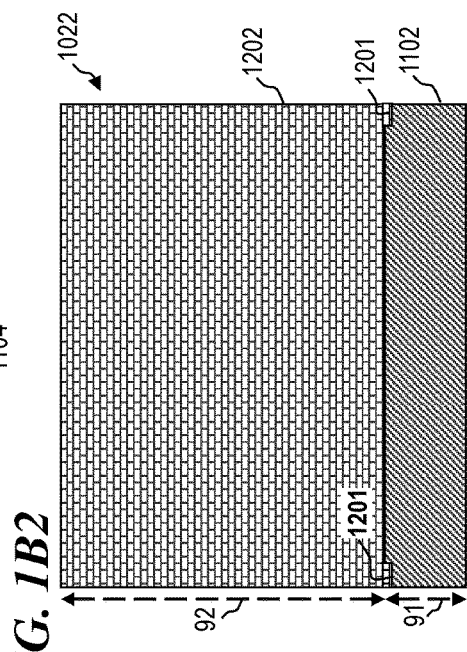
FIG. 1B2
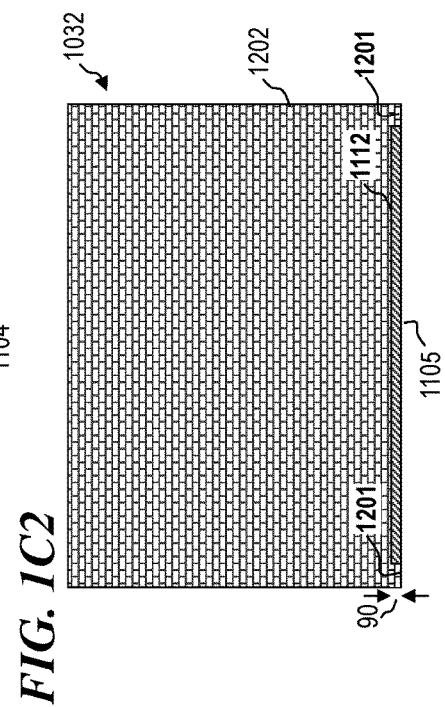
FIG. 1C2

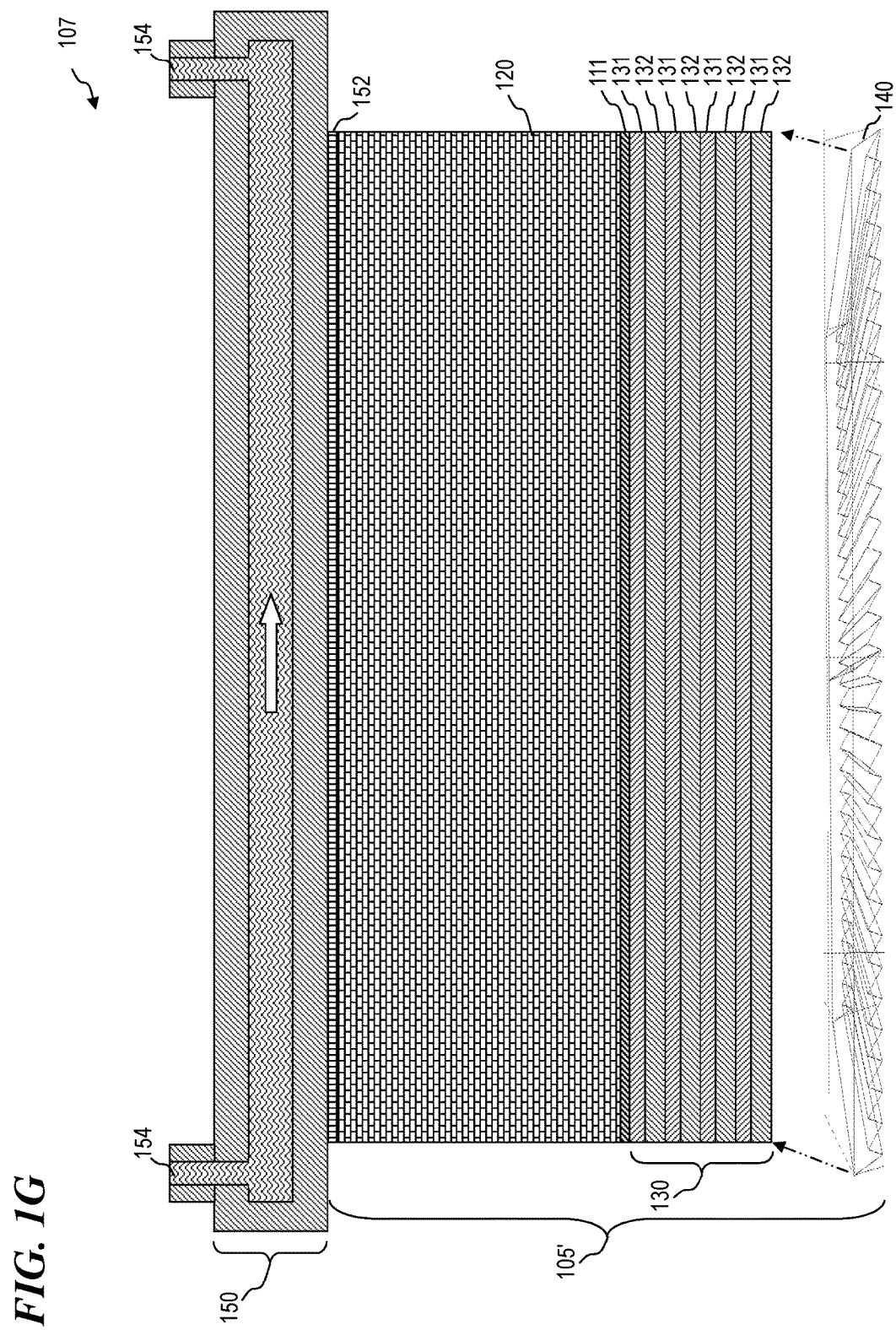

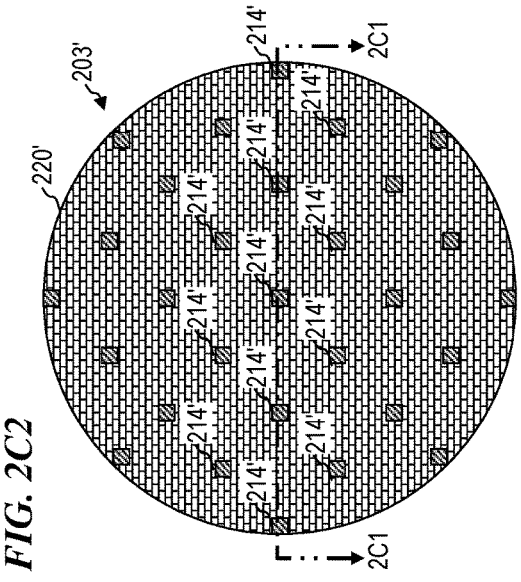
FIG. 2C2
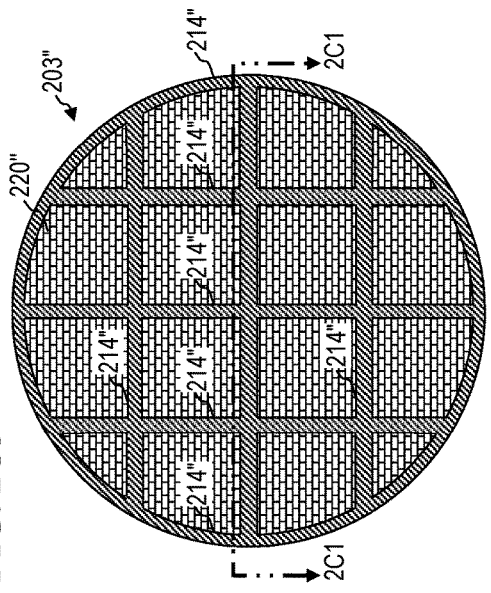
FIG. 2C3
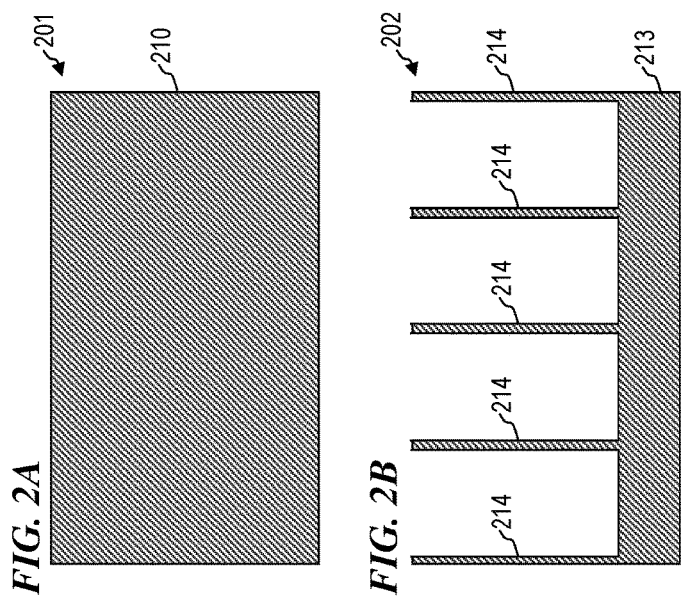
FIG. 2A
FIG. 2B
FIG. 2C1

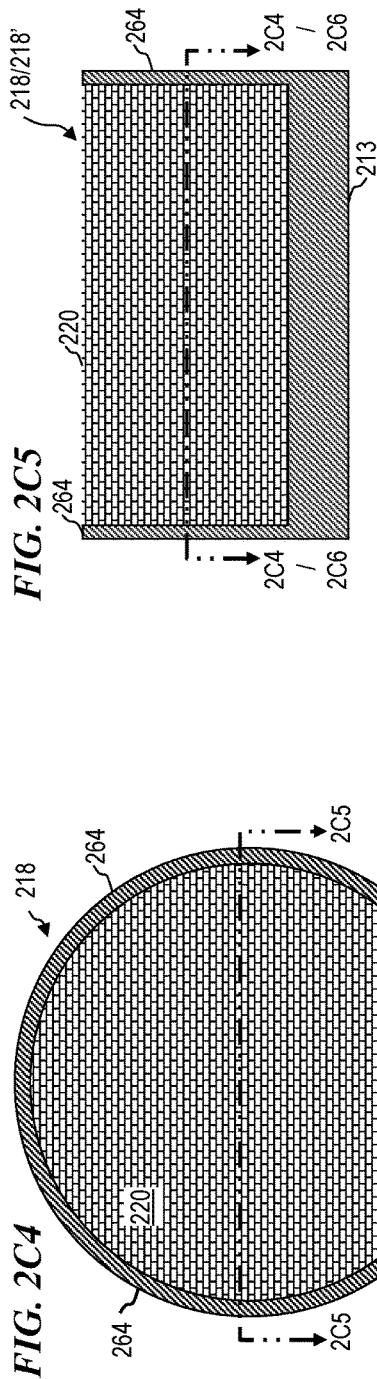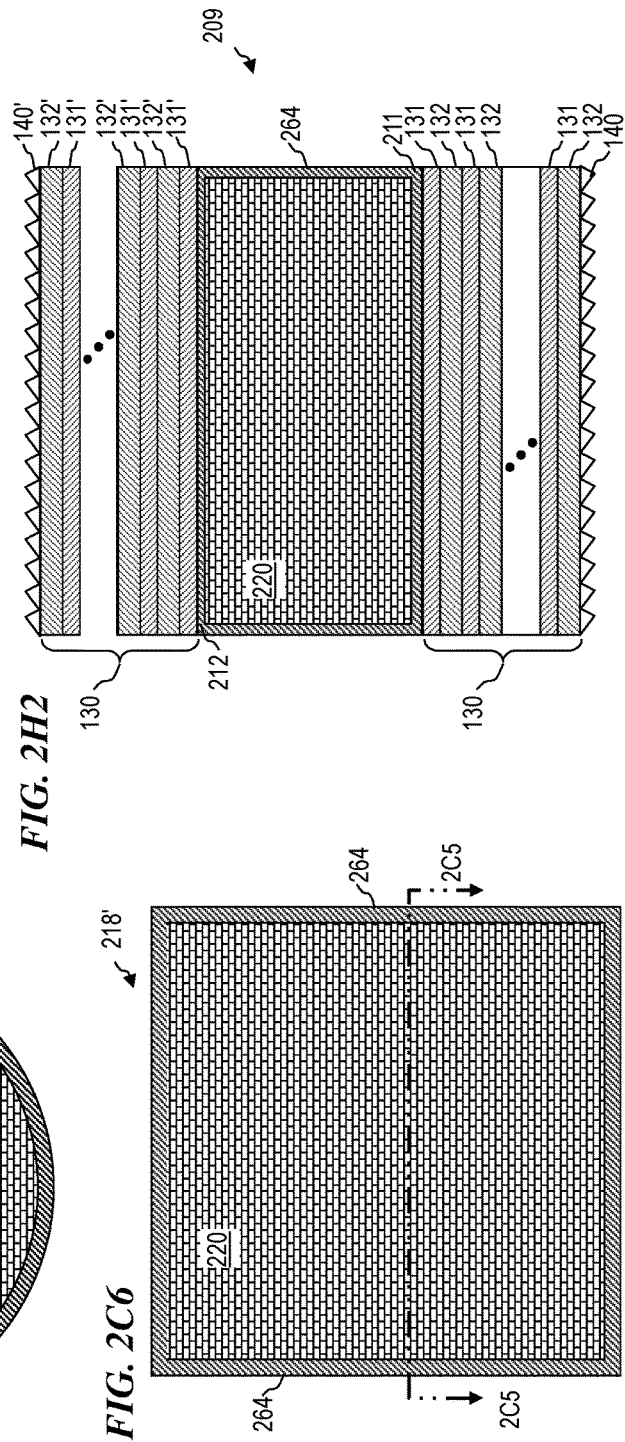

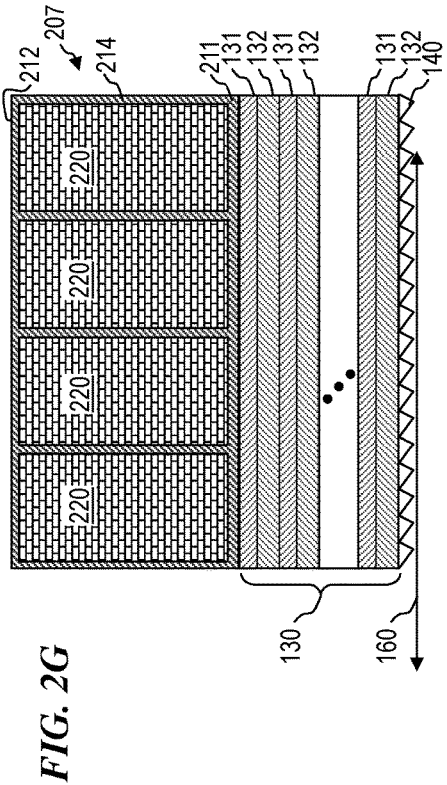
FIG. 2D
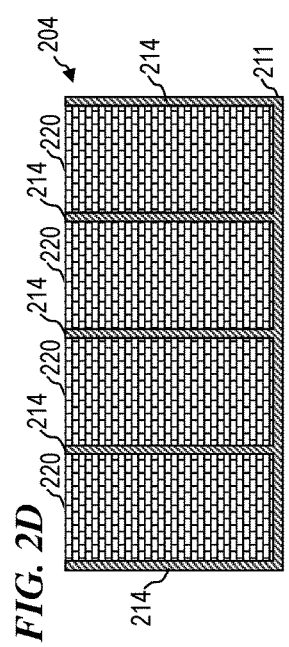
FIG. 2E
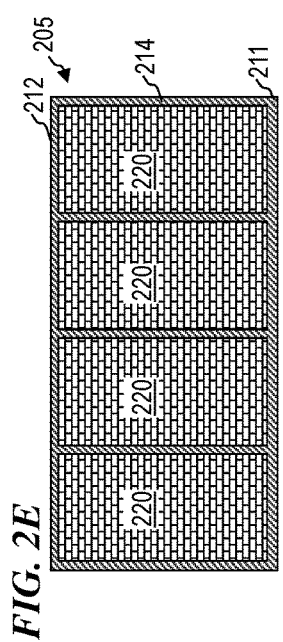
FIG. 2F
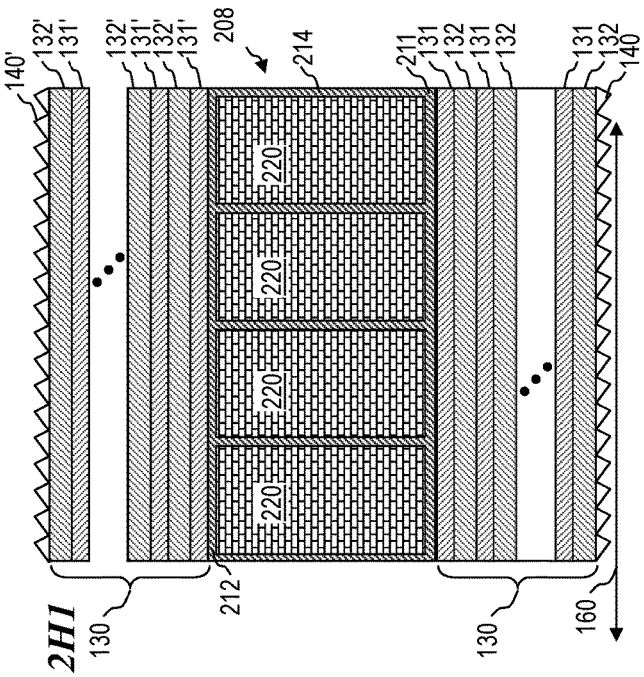
FIG. 2G
FIG. 2H1
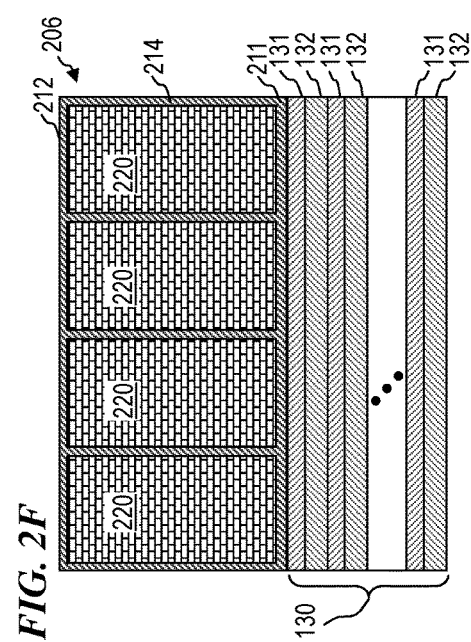

APPARATUS AND METHOD FOR A DIAMOND SUBSTRATE FOR A MULTI-LAYERED DIELECTRIC DIFFRACTION GRATING

CROSS-REFERENCE TO RELATED APPLICATIONS

This application claims priority benefit, under 35 U.S.C. §119(e), of U.S. Provisional Patent Application No. 61/877,796 filed Sep. 13, 2013 by Andrew Xing and Eric C. Honea, titled "APPARATUS AND METHOD FOR A DIAMOND SUBSTRATE FOR A MULTI-LAYERED DIELECTRIC DIFFRACTION GRATING," which is incorporated herein by reference in its entirety.

This application is related to U.S. Pat. No. 8,179,594, which was filed Jun. 30, 2008 and issued May 15, 2012, titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS," which is assigned to the owner of the present application, and which is incorporated herein by reference in its entirety for all purposes.

FIELD OF THE INVENTION

The invention relates generally to high-power optical diffractive grating and lasers and more particularly to methods and apparatus for combining a diamond substrate with a multi-layered dielectric diffraction grating.

BACKGROUND OF THE INVENTION

High-efficiency diffraction gratings are often useful in laser systems that employ very-high-power laser beams. In particular, systems that use spectral-beam combining to increase the total power of a single collimated laser beam to power levels of one megawatt or more have a need for high-efficiency (low-loss) diffraction gratings.

U.S. Pat. No. 7,199,924 to Brown et al. issued Apr. 3, 2007, titled "Apparatus and method for spectral-beam combining of high-power fiber lasers," is assigned to the owner of the present application, and is incorporated herein by reference. In U.S. Pat. No. 7,199,924 Brown et al. describe an apparatus and method for spectral-beam combining light from a plurality of high-power fiber lasers that, in some embodiments, use two substantially identical diffraction gratings in a parallel, mutually compensating configuration to combine a plurality of separate parallel input beams each having a slightly different successively higher wavelength into a single output beam of high quality. In other embodiments, a single diffraction grating is used to combine a plurality of different wavelengths, wherein the input laser beams are obtained from very narrow linewidth sources to reduce chromatic dispersion. In some embodiments, diagnostics and adjustments of wavelengths and/or positions and angles are made dynamically in real time to maintain the combination of the plurality input beams into a single high-quality output beam.

U.S. Pat. No. 8,526,110 to Honea et al. issued Sep. 3, 2013, titled "Spectral-beam combining for high-power fiber-ring-laser systems," is assigned to the owner of the present application, and is incorporated herein by reference. In U.S. Pat. No. 8,526,110 Honea et al. describe a ring-laser system that includes a plurality of ring-laser gain elements and a spectral-beam-combining output stage configured to combine a plurality of beams coming from the gain elements into an output beam and that includes chromatic-dispersion compensation. In some embodiments, the output stage includes a plurality of highly reflective dielectric-coated focussing elements. In some embodiments, the output stage includes a plurality of high-efficiency dielectric-coated grating elements. In some embodiments, the output stage includes a mostly reflective but partially transmissive output mirror and a highly reflective beam-reversing mirror configured to reflect a majority of a backward-traveling signal beam such that it becomes forward traveling. In some embodiments, each gain element further includes a photonic-crystal-rod power amplifier. Some embodiments have an amplitude modulator configured to pulse the plurality of beams, and a timing controller configured to synchronize the pulses of the plurality of beams. Some embodiments further include a non-linear wavelength-conversion device.

U.S. Pat. No. 8,503,840 to Hu et al. issued Aug. 6, 2013 titled "Optical-fiber array method and apparatus," is assigned to the owner of the present application, and is incorporated herein by reference. In U.S. Pat. No. 8,503,840, Hu et al. describe a method and apparatus for forming an optical-fiber-array assembly, which includes providing a plurality of optical fibers including a first optical fiber and a second optical fiber, providing a fiber-array plate that includes a first surface and a second surface, connecting the plurality of optical fibers to the first surface of the fiber-array plate, transmitting a plurality of optical signals through the optical fibers into the fiber-array plate at the first surface of the fiber-array plate, and emitting from the second surface of the fiber-array plate a composite output beam having light from the plurality of optical signals. Optionally, the first surface of the fiber-array plate includes indicia configured to assist in the alignment of the plurality of optical fibers on the first surface of the fiber-array plate. In some embodiments, the second surface of the fiber-array plate includes a plurality of beam-shaping optics configured to shape the composite output beam.

U.S. Pat. No. 8,493,651 to Hu et al. issued Jul. 23, 2013 titled "Apparatus for optical fiber management and cooling," is assigned to the owner of the present application, and is incorporated herein by reference. In U.S. Pat. No. 8,493,651, Hu et al. describe an apparatus and method that provides management and cooling of an optical fiber by looping the optical fiber around the inner surface of a heat-conductive cylinder and around the outer surface of the heat-conductive cylinder, such that the optical fiber enters and exits the heat-conductive cylinder on substantially the same plane. Some embodiments use a continuous groove on the inside and outside of the cylinder for guiding and managing the optical fiber. Some embodiments use a plurality of protruding fiber guides for guiding and managing the optical fiber. Some embodiments use an integrated tube for guiding and managing the optical fiber. In some embodiments, the optical fiber looped on the inner surface and outer surface are spaced apart substantially equally. In some other embodiments, the optical fiber loops are spaced further apart for portions of the fiber carrying higher power.

U.S. Pat. No. 8,441,718 to Mead issued May 14, 2013 titled "Spectrally beam combined laser system and method at eye-safer wavelengths," is assigned to the owner of the present application, and is incorporated herein by reference. In U.S. Pat. No. 8,441,718, Mead describes a method and system in which fiber-laser light is Raman shifted to eye-safer wavelengths prior to spectral beam combination, enabling a high-power, eye-safer wavelength directed-energy (DE) system. The output of Ytterbium fiber lasers is not used directly for spectral beam combining. Rather, the power from the Yb fiber lasers is Raman-shifted to longer wavelengths, and these wavelengths are then spectrally beam combined. Raman shifting is most readily accomplished with a "cascaded Raman converter," in which a series of nested fiber cavities is formed using fiber Bragg gratings.

U.S. Pat. No. 8,411,712 to Honea, et al. issued Apr. 2, 2013 titled "Beam diagnostics and feedback system and method for spectrally beam-combined lasers," is assigned to the owner of the present application, and is incorporated herein by reference. In U.S. Pat. No. 8,411,712, Honea, et al. describe an apparatus and method for control of lasers (which use an array of optical gain fibers) in order to improve spectrally beam-combined (SBC) laser beam quality along the plane of the SBC fiber array via spectral-to-spatial mapping of a portion of the spectrally beam-combined laser beams, detection of optical power in each of the spatially dispersed beams and feedback control of the lasers for wavelength-drift correction. The apparatus includes a diffractive element; a source of a plurality of substantially monochromatic light beams directed from different angles to a single location on the diffractive element, wherein the diffractive element spectrally combines the plurality of light beams into a single beam. A controller adjusts characteristics of the light beams if one of the light beams has become misadjusted. In some embodiments, the controller adjusts the wavelength tuning of the respective fiber laser.

U.S. Pat. No. 8,199,399 to Savage-Leuchs issued Jun. 12, 2012 titled "Optical gain fiber having segments of differing core sizes and associated method," is assigned to the owner of the present application, and is incorporated herein by reference. In U.S. Pat. No. 8,199,399, Savage-Leuchs describes an apparatus and method for amplifying laser signals using segments of fibers of differing core diameters and/or differing cladding diameters to suppress amplified spontaneous emission and non-linear effects such as four-wave mixing (FWM), self-phase modulation, and stimulated Brillouin and/or Raman scattering (SBS/SRS). In some embodiments, different core sizes have different sideband spacings (spacing between the desired signal and wavelength-shifted lobes). Changing core sizes and providing phase mismatches prevent buildup of non-linear effects. Some embodiments further include a bandpass filter to remove signal other than the desired signal wavelength and/or a time gate to remove signal at times other than during the desired signal pulse. Some embodiments include photonic-crystal structures to define the core for the signal and/or the inner cladding for the pump. Some embodiments include an inner glass cladding to confine the signal in the core and an outer glass cladding to confine pump light in the inner cladding.

U.S. Pat. No. 8,179,594 to Tidwell, et al. issued May 15, 2012 titled "Method and apparatus for spectral-beam combining of fanned-in laser beams with chromatic-dispersion compensation using a plurality of diffractive gratings," is assigned to the owner of the present application, and is incorporated herein by reference. In U.S. Pat. No. 8,179,594, Tidwell, et al. describe an apparatus and method for spectral-beam combining of light from a plurality of high-power lasers (e.g., fiber MOPA lasers) that, in some embodiments, use substantially identical diffraction gratings in a 1-D non-parallel, mutually compensating configuration to combine non-parallel converging input beams in one plane each having a slightly different successively higher wavelength into a single output beam of high quality. In other embodiments, an output grating and one or more input gratings in a 1-D parallel, mutually compensating configuration combine non-parallel input beams in one plane into a single output beam of high quality. In other embodiments, a 2-D plurality of input gratings in a non-parallel configuration combine a plurality of non-parallel input beams not in one plane each having a slightly different successively higher wavelength into a set of converging beams in one plane directed towards an output grating that compensates for chromatic dispersions introduced by the input gratings.

U.S. Pat. No. 7,065,107 to Hamilton, et al. issued Jun. 20, 2006 titled "Spectral beam combination of broad-stripe laser diodes," is assigned to the owner of the present application, and is incorporated herein by reference. In U.S. Pat. No. 7,065,107, Hamilton, et al. describe a method and apparatus for improving the beam quality of the emissions from a multimode gain medium such as a broad-stripe laser through the use of SBC techniques is provided. In order to achieve the desired beam quality without a significant reduction in output power, discrete lasing regions are formed across the gain medium using an etalon or similar device located within the SBC cavity.

U.S. Pat. No. 8,094,689 to Koplow issued Jan. 10, 2012 titled "Laser systems configured to output a spectrally-consolidated laser beam and related methods," is incorporated herein by reference. In U.S. Pat. No. 8,094,689, Koplow describes a laser apparatus that includes a plurality of pumps each of which is configured to emit a corresponding pump laser beam having a unique peak wavelength. The laser apparatus includes a spectral beam combiner configured to combine the corresponding pump laser beams into a substantially spatially-coherent pump laser beam having a pump spectrum that includes the unique peak wavelengths, and first and second selectively reflective elements spaced from each other to define a lasing cavity including a lasing medium therein. The lasing medium generates a plurality of gain spectra responsive to absorbing the pump laser beam. Each gain spectrum corresponds to a respective one of the unique peak wavelengths of the substantially spatially-coherent pump laser beam and partially overlaps with all other ones of the gain spectra. The reflective elements are configured to promote emission of a laser beam from the lasing medium with a peak wavelength common to each gain spectrum.

U.S. Pat. No. 6,754,006 titled "Hybrid metallic-dielectric grating" issued Jun. 22, 2004 to Barton et al. and is incorporated herein by reference. This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization-insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

U.S. Pat. No. 6,822,796 to Takada et al. titled "Diffractive optical element" (incorporated herein by reference) describes a method for making blazed gratings having asymmetric grooves with dielectric coatings. U.S. Pat. No. 6,958,859 to Hoose et al. titled "Grating device with high diffraction efficiency" (incorporated herein by reference) describes a method for making gratings having dielectric coatings.

U.S. Pat. No. 5,907,436 titled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

PCT Publication No. WO 2013/062584, which published May 2, 2013, of PCT Patent Application PCT/US11/58352 titled "Devices including a diamond layer" filed Oct. 28, 2011 by Liang et al., is incorporated herein by reference. Liang et al. describe a device that includes a substrate layer, a diamond layer, and a device layer. The device layer is patterned. The diamond layer is to conform to a pattern associated with the device layer.

U.S. Pat. No. 6,830,813 to Ravi, which issued Dec. 14, 2004 and is titled "Stress-reducing structure for electronic devices," is incorporated herein by reference. Ravi describes an electronic apparatus having a heat transfer/stress-reducing layer combined with a device layer and methods of fabricating such electronic apparatus provide a means for incorporating a heat transfer layer in an integrated circuit. A structure with a diamond layer incorporated beneath a device layer provides a heat transfer layer for the structure. In an embodiment, a compliant layer is formed between a diamond layer and a substrate to provide stress reduction. In another embodiment, a diamond layer is formed as a layer of islands of diamond from nucleation centers to provide stress reduction.

U.S. Pat. No. 7,501,330 to Ravi, et al., which issued Mar. 10, 2009 and is titled "Methods of forming a high conductivity diamond film and structures formed thereby," is incorporated herein by reference. Ravi, et al. describe a method of forming a high thermal conductivity diamond film and its associated structures comprising selectively nucleating a region of a substrate, and forming a diamond film on the substrate such that the diamond film has large grains, which are at least about 20 microns in size. The larger grained diamond film has greatly improved thermal management capabilities and improves the efficiency and speed of a microelectronic device.

United States Patent Application Publication 2006/0113545 of Weber et al. was published Jun. 1, 2006, titled "Wide bandgap semiconductor layers on SOD structures," and is incorporated herein by reference. Weber et al. describe multi-layered structures containing GaN on SOD (silicon/diamond/silicon) substrates. The substrate/epilayer combination can provide electronic materials suitable for high-power and opto-electronic devices without commonly observed limitations due to excess heat during device operation. The resulting devices have built-in thermal heat spreading capability that result in better performance and higher reliability.

U.S. Pat. No. 8,236,594 issued to Sung on Aug. 7, 2012, titled "Semiconductor-on-diamond devices and associated methods," and is incorporated herein by reference. U.S. Pat. No. 8,236,594 describes semiconductor-on-diamond devices and methods for making such devices. One such method may include depositing a semiconductor layer on a semiconductor substrate, depositing an adynamic diamond layer on the semiconductor layer opposite the semiconductor substrate, and coupling a support substrate to the adynamic diamond layer opposite the semiconductor layer to support the adynamic layer.

U.S. Pat. No. 7,846,767 to Sung issued Dec. 7, 2010 titled "Semiconductor-on-diamond devices and associated methods," and is incorporated herein by reference. U.S. Pat. No. 7,846,767 describes semiconductor-on-diamond (SOD) substrates and methods for making such substrates. In one aspect, a method of making an SOD device is provided that includes etching depressions into an etch surface of a semiconductor substrate to a uniform depth, depositing a diamond layer onto the etch surface to form diamond-filled depressions, and thinning the semiconductor substrate at a thinning surface opposite the etch surface until the diamond filled depressions are exposed, thus forming a semiconductor device having a thickness substantially equal to the uniform depth.

Even with high-efficiency multi-layered dielectric diffraction gratings such as those described above, a non-negligible amount of energy is absorbed in the grating, which heats and distorts the grating.

There remains a need in the art for improved gratings that improve heat extraction, minimize grating distortion due to unequal coefficients of thermal expansion (CTE), and improve efficiency to reduce grating heating.

SUMMARY OF THE INVENTION

The present invention provides an apparatus and method for making improved gratings that improve heat extraction, minimize grating distortion due to unequal coefficients of thermal expansion, and improve efficiency to reduce grating heating, for example, in gratings used for high-power spectral beam combining (SBC) of laser beams, which helps to maintain the combination of the plurality input beams into a single high-quality output laser beam. In some embodiments, the grating devices of the present invention are used in SBC systems such as described in the several patents listed herein and incorporated by reference.

In some embodiments, the present invention provides a method for making improved gratings that includes growing a thick layer of diamond on a very flat substrate (in some embodiments, the substrate is a silicon substrate), thinning and flattening a face of the substrate (in some embodiments, the flattening includes polishing (such as chemical-mechanical polishing (CMP), diamond turning (e.g., using a sharp diamond tool on a lathe that rotates the workpiece), diamond "fly cutting" (e.g., using a sharp diamond tool on a milling machine that operates in a raster-like tool path relative to the workpiece), diamond milling, or other suitable methods or mechanisms to achieve an optically flat surface) to leave a very thin, very flat first layer of material (such as silicon) on a first (obverse) face of the thick diamond layer. The thin layer of material and the diamond layer have unequal coefficients of thermal expansion, and thus thinning the original silicon substrate on the first face of the diamond reduces the bending or warping stress between the thin first layer of material and diamond layers. In some embodiments, a similar thin layer of a material is deposited or grown on an opposite second (reverse) face of the diamond layer, in order that substantially similar thermal stresses are applied to both major faces of the diamond so that warping distortions of the diamond are reduced, and thus the grating device as a whole remains flatter and less distorted as a result of energy absorption. In some embodiments, the compensating layer is silicon. In some embodiments, the compensating stress layer includes a dielectric and/or metallic film. In some embodiments the non-diamond layers on one or both surfaces of the substrate are polished to provide an optically flat surface on which the grating structure will be subsequently fabricated.

In some embodiments, the second (reverse) face of the diamond is polished before deposition of the layer of compensating material in order that the physical shape and geometry of the layer of compensating material on the second face of the diamond layer is the same or at least substantially similar to the layer of silicon on the first face of the diamond layer (e.g., same thickness (as well as same width and length), similar crystal structures, similar flatness on the diamond interface, and the like).

Some embodiments of the invention include depositing a layer that includes one or more materials other than silicon. In some embodiments, silicon might be optimal to match the CTE of other layers of the device, but other embodiments match the stress over certain limited temperature ranges with a dielectric or metallic film, particularly if one takes advantage of the stresses that may arise during the deposition process, e.g., ion-beam sputtered films.

Some embodiments use the general idea of depositing a sacrificial layer to be flattened (polished, diamond turned, machined, or otherwise flattened) on top of the diamond (or depositing the diamond film onto the sacrificial layer), optionally including a stress-compensating layer on the back side (also called the reverse face) side of the device.

In some embodiments, the flattened (or otherwise processed) optically-flat surface is flat to within about 100 nm (0.1 microns), in order that the grating is similarly flat, such that the grating flatness dimension is much shorter than a wavelength of light to be diffracted by the grating (in some embodiments, the light has a wavelength within a range of about 300 nm (or shorter, in some embodiments) to about 1600 nm (or longer, in some embodiments).

In some embodiments, tiny (e.g., in some embodiments, one micron (1 μm) in diameter, or other suitable size) through-holes are formed completely through the diamond layer (e.g., in some embodiments, in an array of holes with ten micron (10 μm) center-center spacing, or other suitable spacing) in order that single-crystal silicon forms through the holes and thus makes the silicon layer on the second face of the diamond the identical single-crystal geometry as the silicon on the first face. In some other embodiments, the original silicon wafer is patterned (using photolithography, electron-beam, or other suitable patterning method well-known in the art) and etched in order to leave an array of very thin silicon posts or needles extending outward from and on the first face, then diamond is deposited via chemical-vapor deposition (CVD) on the first face such that the very thin silicon posts form the single-crystal seeds that form the basis for the single-crystal silicon on the second face that matches the single crystal silicon on the first face. In some embodiments, after the diamond layer is deposited, the second face is flattened to be reasonable flat (polishing diamond to be optically flat is difficult, but some flattening allows subsequent layers to have a substantially even thickness), exposing the tips of the very thin silicon posts or needles extending or facing outward from or on the first face. The silicon layer on the second face is then grown laterally and outward from the exposed tips of the silicon, in order to completely cover the second face of the diamond layer with flat single-crystal silicon that matches the geometry of the silicon on the first face of the diamond layer, in a manner similar to growing single-crystal silicon layers for conventional silicon-on-insulator (SOI) devices on silicon-oxide layers on a "mother" silicon wafer. Even if heating causes the seed needles to later break, the thin silicon layers on the faces of the diamond layer will remain intact and provide even thermal stresses on both faces. In some embodiments, the silicon needles form less than 1% (e.g., such as using a Cartesian array of 1-μm needles on a 10-μm by 10-μm array, or, in other embodiments, less than 5% or less than 10%) of the area of the diamond layer.

BRIEF DESCRIPTION OF THE DRAWINGS

FIG. 1A1 is a cross-sectional side view of an in-process device 101 including starting silicon substrate 110 according to one embodiment of the present invention.

FIG. 1B1 is a cross-sectional side view of an in-process device 102 including silicon substrate 110 and diamond layer 120, according to one embodiment of the present invention.

FIG. 1C1 is a cross-sectional side view of an in-process device 103 including a thin remaining layer 111 of the original silicon substrate 110 and diamond layer 120, according to one embodiment of the present invention.

FIG. 1D is a cross-sectional side view of an in-process device 104 including a thin remaining layer 111 of the original silicon substrate 110 and diamond layer 120, with an additional deposited silicon layer 112, according to one embodiment of the present invention.

FIG. 1E is a cross-sectional side view of an in-process device 105 including a thin remaining layer 111 of the original silicon substrate 110 and diamond layer 120, with an additional deposited silicon layer 112, and a plurality 130 of pairs 131 and 132 of dielectric layers and a grating 140, according to one embodiment of the present invention.

FIG. 1A2 is a cross-sectional side view of an in-process device 1012 including starting silicon substrate 1102 with groove 1101 according to one embodiment of the present invention.

FIG. 1B2 is a cross-sectional side view of an in-process device 1022 including silicon substrate 1102 and diamond layer 1202 with ridge 1201, according to one embodiment of the present invention.

FIG. 1C2 is a cross-sectional side view of an in-process device 1032 including a thin remaining layer 1112 of the original silicon substrate 1102 and diamond layer 1202 with ridge 1201, according to one embodiment of the present invention.

FIG. 1F is a cross-sectional side conceptual exploded-perspective view of a device 106 including a thin remaining layer 111 of the original silicon substrate 110 and diamond layer 120, and a lower structure 145 (which includes a plurality 130 of pairs 131 and 132 of dielectric layers and a grating 140, together) formed on layer 111, with an additional deposited silicon layer 112 and an upper structure 145' (which includes a plurality 130' of pairs 131 and 132 of dielectric layers and a grating 140', together) formed on layer 112, according to one embodiment of the present invention.

FIG. 1G is a cross-sectional side view of a device 107 including a thin remaining layer 111 of the original silicon substrate 110 and diamond layer 120 and a plurality 130 of pairs 131 and 132 of dielectric layers and a grating 140, with an additional layer 152 (e.g., solder, heat-sink compound, or other suitable interface material) that holds diamond layer 120 to a heatsink 150 (which optionally includes a circulating cooling fluid 154), according to one embodiment of the present invention.

FIG. 2A is a cross-sectional side view of an in-process device 201 including starting silicon substrate 210 according to one embodiment of the present invention.

FIG. 2B is a cross-sectional side view of an in-process device 202 including silicon substrate 213 and silicon posts or walls 214 left after etching, according to one embodiment of the present invention.

FIG. 2C1 is a cross-sectional side view of an in-process device 203 including silicon substrate 213, silicon posts 214 and diamond layer 220, according to one embodiment of the present invention.

FIG. 2C2 is a cross-sectional plan view of an in-process device 203' including silicon substrate 213 (not shown in this figure), silicon posts 214' and diamond layer 220', according to one embodiment of the present invention.

FIG. 2C3 is a cross-sectional plan view of an in-process device 203" including silicon substrate 213 (not shown in this figure), silicon walls 214" and diamond layer 220", according to one embodiment of the present invention.

FIG. 2C4 is a cross-sectional plan view of an in-process device 218 including silicon substrate 213 (not shown in this figure), circumferential silicon wall 264 and diamond layer 220, according to one embodiment of the present invention.

FIG. 2C5 is a cross-sectional side view of an in-process device 218 (if cross section of circular substrate as shown in FIG. 2C4) or 218' (if cross section of square substrate as shown in FIG. 2C6) including silicon substrate 213, circumferential silicon wall 264 and diamond layer 220, according to one embodiment of the present invention.

FIG. 2C6 is a cross-sectional plan view of an in-process device 218' including silicon substrate 213 (not shown in this figure), circumferential silicon wall 264 and diamond layer 220, according to one embodiment of the present invention.

FIG. 2D is a cross-sectional side view of an in-process device 204 including a thin remaining layer 211 of the original silicon substrate 210, posts or walls 214 and diamond layer 220, according to one embodiment of the present invention.

FIG. 2E is a cross-sectional side view of an in-process device 205 including a thin remaining layer 211 of the original silicon substrate 210 and diamond layer 220, with an additional deposited silicon layer 212, according to one embodiment of the present invention.

FIG. 2F is a cross-sectional side view of an in-process device 206 including a thin remaining layer 211 of the original silicon substrate 210 and diamond layer 220, with an additional deposited silicon layer 212, and a plurality 130 of pairs 131 and 132 of dielectric layers (before adding a grating 140), according to one embodiment of the present invention.

FIG. 2G is a cross-sectional side view of an in-process device 207 including a thin remaining layer 211 of the original silicon substrate 210 and diamond layer 220, with an additional deposited silicon layer 212, and a plurality 130 of pairs 131 and 132 of dielectric layers and a grating 140, according to one embodiment of the present invention.

FIG. 2H1 is a cross-sectional side view of an in-process device 208 including a thin remaining layer 211 of the original silicon substrate 210 and diamond layer 220, with an additional deposited silicon layer 212, and a plurality 130 of pairs 131 and 132 of dielectric layers and a grating 140, according to one embodiment of the present invention.

FIG. 2H2 is a cross-sectional side view of an in-process device 209 including a thin remaining layer 211 of the original silicon substrate 210 and diamond layer 220, with an additional deposited silicon layer 212, a plurality 130 of pairs 131 and 132 of dielectric layers and a grating 140 on one face (the lower face in this figure), and a plurality 130' of pairs 131' and 132' of dielectric layers and a grating 140' on an opposite face (the upper face in this figure), according to one embodiment of the present invention.

FIG. 5 is a block diagram of a system and/or method 500 for making and using the present invention, according to some embodiments of the present invention.

DESCRIPTION OF PREFERRED EMBODIMENTS

Figure 1H:
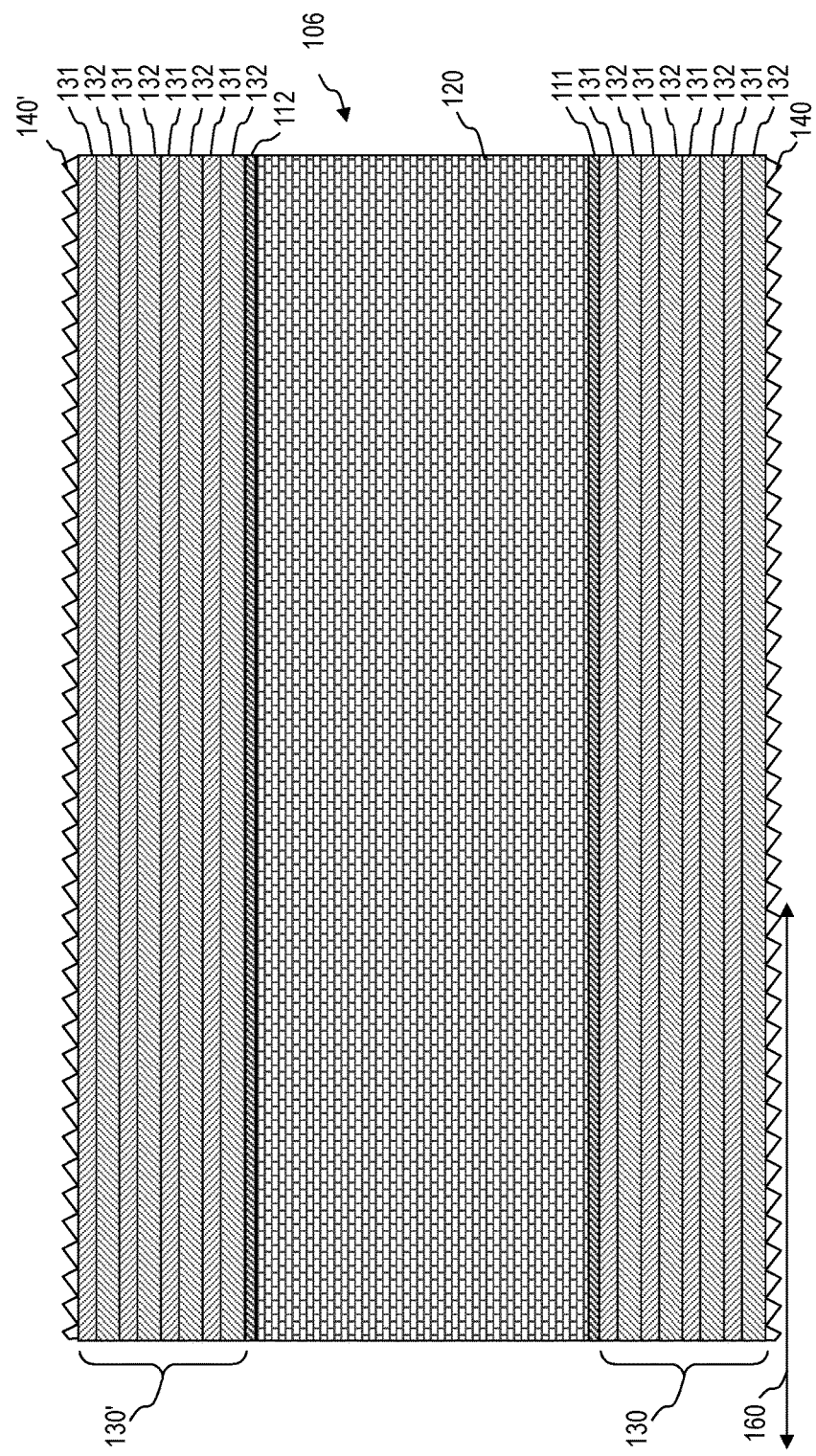
FIG. 1H is a cross-sectional side view of device 106 (which is depicted in exploded-perspective view in FIG. 1F), according to one embodiment of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

FIG. 1A1 is a cross-sectional side view of an in-process device 101 including starting silicon substrate 110 according to one embodiment of the present invention. In some embodiments, the single-crystal silicon substrate 110 (called a wafer) of any suitable size (e.g., in some embodiments, suitable sizes include circular substrates (in some embodiments, the outer edge has a ground flat on one side to indicate the direction of the crystal structure) having diameters of about 2.54 cm. (about 1 inch), about 5.1 cm. (about 2 inches), about 7.6 cm. (about 3 inches), about 10 cm. (about 3.9 inches), about 12.5 cm. (about 4.9 inches), about 15 cm. (about 5.9 inches), about 20 cm. (about 7.9 inches), about 25.4 cm. (about 10 inches), about 30 cm. (about 11.8 inches), about 45 cm. (about 17.7 inches), or within one of the ranges each defined as between any selected two of the above diameters).

In some embodiments, the starting thickness of the silicon substrate 110 is about 150 microns (150 μm). In some embodiments, the starting thickness of the silicon substrate 110 is selected based on the wafer diameter, for example, a 2-inch (51-mm)-diameter wafer with a thickness 275 μm, a 3-inch (76-mm)-diameter wafer with a thickness 375 μm, a 4-inch (100-mm)-diameter wafer with a thickness 525 μm, a 5-inch (130-mm)-diameter wafer or 125-mm (4.9-inch)-diameter wafer with a thickness 625 μm, a 150-mm (5.9-inch, usually referred to as "6-inch")-diameter wafer with a thickness 675 μm, a 200-mm (7.9-inch, usually referred to as "8-inch")-diameter wafer with a thickness 725 μm, a 300-mm (11.8-inch, usually referred to as "12-inch")-diameter wafer with a thickness 775 μm, or a 450-mm (17.7-inch, usually referred to as "18-inch")-diameter wafer with a thickness 925 μm. In other embodiments, other initial thicknesses are used.

In the terminology of the present description, face 1103 is called the reverse face, since it will be facing away from the operational grating 140 that is formed on the obverse face of the grating structure 1105 of FIG. 1E or the grating structure 106 of FIG. 1F, while face 1104 is called the obverse face, since it will be polished or machined thin (leaving face 1105 of FIG. 1C1). The operational stack of pairs of dielectric layers 130 will be deposited on obverse face of layer 1105 and facing toward the operational grating 140 that is formed on the obverse face of the grating structure 105 of FIG. 1E.

In some embodiments, face 1103 is made optically flat by flattening (flat to within a proper fraction of the wavelength of light to be diffracted by the grating deposited later). In some embodiments, the flattening includes polishing (such as chemical-mechanical polishing (CMP), while in other embodiments, the flattening includes diamond turning or milling, or diamond fly cutting, or other suitable methods or mechanisms to achieve an optically flat surface) to leave a very thin (as thin as practical while still covering substantially all roughness of the diamond layer with material that can be made optically flat), very flat (in some embodiments, flat to within 100 nm (0.1 microns), in order to be flat within a proper fraction of the wavelength of light) first layer of material (such as silicon) on a first (obverse) face of the thick diamond layer. It is very difficult to form, polish or machine the diamond layer itself to be flat to within 100 nm, so the material is chosen to have a crystal structure that supports substantially single-crystal diamond formation over at least small areas of the surface. The thin layer of material and the diamond layer have unequal coefficients of thermal expansion, and thus thinning the original substrate (e.g., in some embodiments, silicon) on the first (obverse) face of the diamond reduces the bending or warping stress between the thin first layer of material and diamond.

In some embodiments, for each of the embodiments described herein as using polishing for flattening a surface, other embodiments of the present invention use other methods or mechanisms, such as diamond turning, diamond fly cutting, or other machining processes or machines.

FIG. 1B1 is a cross-sectional side view of an in-process device 102 including silicon substrate 110 and diamond layer 120, according to one embodiment of the present invention. In some embodiments, at this stage in the process, a diamond layer 120 has been grown on the substrate 110. In some embodiments, diamond layer 120 extends laterally to the outer edge of substrate 110. In some embodiments, diamond layer 120 has a thickness 92 that is greater than the thickness 91 of substrate 110. In some embodiments, thickness 92 is about 1 mm. In some embodiments, thickness 92 is between about 1 mm and about 2 mm. In some embodiments, thickness 92 is between 1 mm and 2 mm, inclusive. In some embodiments, thickness 92 is between 2 mm and 3 mm. In some embodiments, thickness 92 is greater than 3 mm. In some embodiments, thickness 92 is greater than 4 mm.

Chemical-vapor-deposition (CVD) diamond is made using CVD process. In some embodiments, the CVD process starts with silicon wafer 110, and carbon atoms from carbon precursor are deposited by CVD on silicon wafer 110 to form diamond layer 120. In some embodiments, after the CVD diamond layer 120 reaches the desired thickness, the silicon wafer 110 is removed from the CVD diamond 120. In other embodiments, the silicon wafer 110 is thinned to leave a very thin layer 111 (see FIG. 1C1 or 1C2). CVD diamond is commonly used as heat spreaders for high-heat-flux semiconductor devices. The challenge of using CVD diamond as grating substrate is that diamond sheet cannot easily be polished to the desired surface quality needed for grating fabrication. In some embodiments, the present invention leaves a thin layer of silicon (in some embodiments, a sub-micron thickness 90) on the CVD diamond layer 120, so that the thin silicon layer 111 can be polished to the desired surface quality for grating fabrication. The present invention takes advantage of combining CVD diamond superior thermal conductivity, and the manufacturability (in particular, the ability to polish to a uniform sub-micron thickness of sufficient flatness and smoothness) of silicon.

FIG. 1C1 is a cross-sectional side view of an in-process device 103 including a thin remaining layer 111 of the original silicon substrate 110 and diamond layer 120, according to one embodiment of the present invention. In some embodiments, at this stage in the process, the substrate 110 has been thinned by a suitable process, such as chemical-mechanical polishing (CMP), to leave only a very thin layer of silicon 111 having a substantially uniform thickness. Since diamond is a better conductor of heat than is silicon, the small thickness is important to help heat flow in some embodiments. In some embodiments, the thin layer of silicon 111 is less than about 100 microns (µm) in thickness. In some embodiments, the thin layer of silicon 111 is less than about 50 microns in thickness. In some embodiments, the thin layer of silicon 111 is less than about 25 microns in thickness. In some embodiments, the thin layer of silicon 111 is less than about 10 microns in thickness. In some embodiments, the thin layer of silicon 111 is between about 1 micron and about 10 microns in thickness. In some embodiments, the thin layer of silicon 111 is less than about 1 micron in thickness. In some embodiments, the thin layer of silicon 111 is between about 0.01 micron and about 1 micron in thickness. In some embodiments, the thin layer of silicon 111 is between about 0.05 micron and about 0.5 micron in thickness. In some embodiments, it is important to leave the thin layer of silicon 111 (rather than removing all of the silicon substrate 110) because it is more difficult to polish a wafer-sized surface of diamond to the desired surface quality (i.e., flatness and smoothness) for high-quality diffraction grating fabrication, than it is to polish silicon layer 111 in a manner that achieves the quality desired.

In other embodiments (shown and described below for FIGS. 1A2, 1B2, and 1C2), a single perimeter groove is etched to a predetermined uniform depth in the top surface of silicon substrate 110 before deposition of diamond layer 120. In some embodiments, this single groove's perimeter is circular in shape when viewed from a direction perpendicular to the top surface of silicon substrate 110, while in other embodiments, the single polygonal perimeter (if around a polygonal substrate as shown in FIG. 2C6) groove is rectangular, square, or other suitable shape, corresponding to the shape of the substrate 110 in those embodiments. The groove has a square or rectangular cross-sectional shape (perpendicular to the length of the groove). In other embodiments, a plurality of concentric perimeter grooves is used. In some embodiments, perimeter groove(s) provide an improvement over the plurality of depressions described in U.S. Pat. No. 7,846,767 to Sung issued Dec. 7, 2010 titled "Semiconductor-on-diamond devices and associated methods," which are used for a similar purpose of being a polishing "stop" (in the present invention, the groove in the silicon forms a ridge in the diamond layer, wherein the ridge will prevent further thinning of layer 111 once the polishing reaches that ridge) in order to obtain a uniform thickness of silicon layer 111 after the rest of substrate 110 is polished away. In some such embodiments, the single annular groove is located at or near an outer circumference of substrate 110 in order that a single uninterrupted silicon layer is formed within the single annular groove (in some such embodiments, the outer edge of substrate 103 including the ridge in the diamond layer is removed after the polishing of silicon layer 111 has completed).

FIG. 1D is a cross-sectional side view of an in-process device 104 including a thin remaining layer 111 of the original silicon substrate 110 and diamond layer 120, with an additional deposited silicon layer 112, according to one embodiment of the present invention. In some embodiments, additional deposited silicon layer 112 provides a substantially equal coefficient of thermal expansion (CTE)-caused stress on its surface (e.g., the upper surface of CVD diamond layer 120 in the figure) as the CTE-caused stress caused by silicon layer 111 on its opposing surface (e.g., the lower surface of CVD diamond layer 120 in the figure). In other embodiments, instead of, or in addition to, silicon layer 112, a conformal layer of one or more other materials is deposited on the upper surface in FIG. 1D. In some embodiments, this conformal layer on the upper surface is of material(s) chosen to provide a matching stress to that of the combination of layers formed on the bottom surface (e.g., the layers below diamond layer 120 shown in FIG. 1E).

FIG. 1E is a cross-sectional side view of an in-process device 105 including a thin remaining layer 111 of the original silicon substrate 110 and diamond layer 120, with the additional deposited silicon layer 112 (and/or other conformal coating), and a plurality 130 of pairs 131 and 132 of dielectric layers and a grating 140, according to one embodiment of the present invention. In some embodiments, grating 140 is not blazed and the groove shape is symmetrical. In some other embodiments, grating 140 is a blazed grating wherein the left-facing wall and the right-facing wall of each groove are of different angles relative to the overall plane of the bottom surface (the horizontal plane in FIG. 1E), in order to enhance grating efficiency at or near the Littrow angle. In other embodiments, any other suitable grating cross-sectional geometry can be used, depending on design goals and economic cost goals. In some embodiments, a plurality 130 of pairs of dielectric layers 131 and 132 are successively deposited until a desired reflectivity is achieved for the range of wavelengths of interest, for example, in some embodiments, using methods such as are described in U.S. Pat. No. 5,907,436 titled "Multilayer dielectric diffraction gratings" issued May 25, 1999 to Perry et al., which is incorporated herein by reference. In some embodiments, a dielectric material that exhibits low absorption at the wavelength(s) of interest can be used to form the dielectric layers. In some embodiments, oxides (e.g., $HfO_2$, $SiO_2$, $Ta_2O_5$, $Nb_2O_5$, $Sc_2O_3$, $ZrO_2$, $TiO_2$, $Al_2O_3$, etc.) are used to form the multilayer structure, such that the gratings can be fabricated to exhibit a high threshold for damage by intense optical radiation, making them suitable for use with high-power lasers in the range 300 nm to over 1500 nm. In some embodiments, at wavelengths longer than about 1500 nm, sulfides (e.g., ZnS), selenides (e.g., ZnSe) or fluorides (e.g., $ThF_4$) are used, since they offer negligible absorption and hence high damage threshold. For very short wavelength use, low-index-of-refraction fluorides such as $MgF_2$, $CaF_2$, LiF, are used in some embodiments, in conjunction with higher index oxides or higher index fluorides (e.g., $ThF_4$) to form the multilayer plurality 130 of pairs of dielectric layers.

In some embodiments, the sacrificial substrate includes a material other than silicon, such as an aluminum oxide, and the very thin optically flat layer 1105 is a layer that includes a metal or metal-like compound such as hafnium nitride that is grown to match a lattice constant of the sacrificial substrate and of the diamond layer. In some embodiments, the sacrificial substrate leaves an optically flat thin layer when the substrate is etched away.

FIG. 1A2 is a cross-sectional side view of an in-process device 1012 including starting silicon substrate 1102 with groove 1101 according to one embodiment of the present invention. In some embodiments, a single groove 1101 is etched or ion milled or otherwise formed in the surface 1103 of silicon substrate 1102 to a uniform or substantially uniform depth, in order that the diamond layer 1202 will have a corresponding ridge at a uniform or substantially uniform height relative to the bottom major face of diamond layer 1202. In some embodiments, single groove 1101 is formed around an outer circumference of silicon substrate 1102, while in other embodiments, single groove 1101 is formed inward from the outer circumference of silicon substrate 1102 to surround a smaller area of surface 1103. A single groove 1101 around the outer circumference of silicon substrate 1102 allows an uninterrupted layer of diamond to contact the grating that is formed later. In some embodiments (not shown), one or more additional grooves (e.g., concentric to the circumference groove) or pits are also formed. In some embodiments, single groove 1101 is used, but is made relatively wide (e.g., one to ten mm) around the outer circumference of substrate 1102 in order to provide a correspondingly wide ridge used as a robust stop for the later polishing operation. In some embodiments, the perimeter groove 1101 is circular (if substrate 1102 is circular such as shown in FIG. 2C4), corresponding to the shape of perimeter of the substrate in those embodiments. In some embodiments, the perimeter groove 1101 is rectangular, square (if substrate 1102 is square such as shown in FIG. 2C6), or other suitable shape, corresponding to the shape of perimeter of the area of surface 1103 on the substrate in those embodiments.

In the terminology of the present description, face 1103 is called the reverse face, since it will be facing away from the operational grating 140 that is formed on the obverse face of the final grating structure 106 of FIG. 1F, while face 1104 is called the obverse face, since it will be polished thin (leaving face 1105 of FIG. 1C2). The operational stack of pairs of dielectric layers 130 will be deposited on obverse face of layer 1105 and facing toward the operational grating 140 that is formed on the obverse face of the final grating structure 106 of FIG. 1F.

FIG. 1B2 is a cross-sectional side view of an in-process device 1022 including silicon substrate 1102 and diamond layer 1202 with ridge 1201, according to one embodiment of the present invention. Ridge 1201 in the grown CVD diamond layer corresponds to groove 1101.

FIG. 1C2 is a cross-sectional side view of an in-process device 1032 including a thin remaining layer 1112 of the original silicon substrate 1102 and diamond layer 1202 with ridge 1201 that functioned as a stop for the polishing, according to one embodiment of the present invention.

FIG. 1F is a cross-sectional side perspective view of an in-process device 106 including a thin remaining layer 111 of the original silicon substrate 110 and diamond layer 120, and a lower structure 145 (which includes a plurality 130 of pairs 131 and 132 of dielectric layers and a grating 140) that is formed on layer 111, with an additional deposited silicon layer 112 and an upper structure 145' (which includes a plurality 130' of pairs 131 and 132 of dielectric layers and a grating 140') that is formed on layer 112, according to one embodiment of the present invention. In some embodiments, the lower structure 145 on layer 111 is substantially identical and mirror-symmetric to upper structure 145' on layer 112, in order to provide an equal thermal-expansion stress on both the top and bottom surface of diamond layer 120. In some embodiments, the top grating 140' is used as an alternative to grating 140 in order to increase yield in case of a flaw in grating 140. In some embodiments, the top surface (as depicted in FIG. 1F) of diamond layer 120 is polished flat before deposition of top silicon layer 112.

FIG. 1G is a cross-sectional side view of a device 107 including a thin remaining layer 111 of the original silicon substrate 110 and diamond layer 120 and a plurality 130 of pairs 131 and 132 of dielectric layers and a grating 140, with an additional layer 152 (e.g., solder, heat-sink compound, or other suitable interface material) that holds diamond layer 120 to a heatsink 150 that optionally includes a circulating cooling fluid 154), according to one embodiment of the present invention. In some embodiments, cooling fluid 154 is a liquid such as, for example, water, while in other embodiments, cooling fluid 154 is a gas such as, for example, helium. In some embodiments, heatsink 150 is made thin and flexible, in order that it is compliant and any difference between its coefficient of thermal expansion (CTE) and the CTE of grating structure 105' will not adversely affect the flatness of grating 140. In some embodiments, any suitable heatsink geometry and/or material(s) are used.

In other embodiments, heatsink 150 is made using a very stiff material and/or geometric structure (e.g., in some embodiments, heatsink 150 has a honeycomb or perforated honeycomb internal structure). In some embodiments, layer 152 includes a heat-sink compound in paste or grease form, which allows lateral movement of the face of diamond layer 120 relative to the face of heatsink 150, while sealing out air from the interface between the face of diamond layer 120 and the face of heatsink 150 (in a manner similar to maintaining a vacuum, except in this case, no open volume of vacuum exists between diamond layer 120 and heatsink 150), in order that air pressure across the open grating face of grating 140 presses the entire grating and diamond structure against a stiff flat heatsink 150, thus maintaining the flatness of grating 140.

In yet other embodiments, interface layer 152 includes a compliant adhesive heatsink compound and the bottom face of heatsink 150 and the adhesive interface layer 152 provide a composite layered material that provides a counterbalancing CTE force that compensates for the CTE force resulting from the layers on the opposite face of diamond layer 120 (i.e., remaining silicon layer 111, the plurality of dielectric layer pairs 131-132, and grating 140), such that the balancing forces accommodate each other and maintain the flatness of the outer optical surface of grating 140.

FIG. 1H is a cross-sectional side view of device 106 (which is depicted in exploded-perspective view in FIG. 1F), according to one embodiment of the present invention. In some embodiments of the present invention, an identical or substantially identical (except for having mirror-image geometries) series of layers (including silicon, dielectric pairs, and grating) is formed on both major surfaces (top and bottom in this figure) of diamond layer 120, in order that the CTE forces on both faces are identical or substantially identical when grating device 106 is in thermal equilibrium, in order to maintain the optical flatness of the grating 140 to which the laser beams of a spectral-beam combiner (SBC) system are impinging. In some embodiments, grating device 106 is used in a very-high-power SBC laser system, in which beams having a megawatt (1 MW) or more power levels are used. In some embodiments, grating devices of the present invention are used in an SBC laser system such as described in U.S. Pat. No. 7,199,924 titled "Apparatus and method for spectral-beam combining of high-power fiber lasers," which is assigned to the owner of the present application, and is incorporated herein by reference. In some embodiments, the thicknesses of the pairs of dielectric layers 130 and 131 are varied in order to obtain a best compromise grating efficiency over a wider range of different wavelengths used by the plurality of input lasers whose beams are SBC combined by the output grating, as is described in some of the various patents incorporated herein by reference. In some embodiments, the angles of the walls of the grooves of the grating (those walls facing to the lower left in the figure versus those walls facing to the lower right in the figure of the sawtooth cross section of the grating relative to the overall plane of the obverse face) are chosen to obtain the best possible diffraction efficiency for the desired set of wavelengths that are combined using SBC, as is described in some of the various patents incorporated herein by reference. In other embodiments (not shown), grating 140 is not blazed (not sawtoothed in cross section). Note that top layer stack 130' exhibits a slight difference compared to bottom stack 130 in this embodiment, in that thicker dielectric layer 132 is closest to diamond 120 on the top and thinner dielectric layer 131 is closest to diamond 120 on the bottom. In contrast, FIG. 1F has exact mirror-image stacks of layers 130' versus 130, with layer 131 being closest to the diamond on both the top and bottom.

FIG. 2A is a cross-sectional side view of an in-process device 201 including starting silicon substrate 210 according to one embodiment of the present invention. In some embodiments, this and the rest of the FIGS. 2B-2H2 describe apparatus, structures and methods that are used to obtain an epitaxial silicon crystal structure on the reverse face (that face which is opposite the obverse face on which the final optical grating is formed) that matches the silicon crystal structure on the obverse face. In some embodiments, having the same identical crystal structure and geometry on both major faces of diamond layer 220 helps to better maintain equal CTE forces on both faces, and thus maintain grating flatness. In some embodiments, starting silicon substrate 210 is etched to form one or more pockets in which the diamond layer is formed.

FIG. 2B is a cross-sectional side view of an in-process device 202 including silicon substrate 213 and silicon posts 214 left after etching, according to one embodiment of the present invention. The posts and/or walls provide a continuous single-crystal structure that extends through the diamond layer in order that single-crystal silicon can be overgrown on the reverse face of the diamond layer 220.

FIG. 2C1 is a cross-sectional side view of an in-process device 203 including silicon substrate 213, silicon posts 214 and diamond layer 220, according to one embodiment of the present invention. In some embodiments, diamond layer 220 is deposited by a CVD process. In some embodiments, the resulting diamond layer is polycrystalline (many small crystals that completely fill the spaces around and between the silicon posts and/or walls). In some embodiments, the reverse face of diamond layer 220 is therefore rough with many pointed crystal tips of the various micro diamond crystals extending outward from the reverse face. In some such embodiments, the pointed diamond tips are polished flat before epitaxially growing the silicon reverse-side capping layer 212. The cross-sectional side view shown in FIG. 2C1 represents cross-section along dash-dot line 2C1 of FIG. 2C2 or 2C3 after the obverse silicon face (the bottom face in this figure) has been polished to a desired thinness.

FIG. 2C2 is a cross-sectional plan view of the reverse face of an in-process device 203' including silicon substrate 213 (not shown in this figure, because it is on the obverse face opposite the face shown here), silicon posts 214' and diamond layer 220', according to one embodiment of the present invention. In some embodiments, silicon is grown in a lateral direction from the tips of each post until the reverse face of diamond layer 220' is completely covered by silicon. Even if the silicon grown laterally from any one post does not exactly match the crystal structure of the silicon grown laterally its adjoining posts at the interface boundary between those areas of laterally grown silicon, the majority of diamond layer 220' will be covered by single-crystal silicon that will match the CTE of the silicon on the opposite face once both faces are polished to the same thickness. The cross-sectional plan view shown in FIG. 2C2 represents cross-section along dash-dot line 2C2/2C3 of FIG. 2C1 when silicon posts are used to obtain the desired epitaxial structure on the reverse face.

FIG. 2C3 is a cross-sectional plan view of an in-process device 203" including silicon substrate 213 (not shown in this figure), silicon walls 214" and diamond layer 220", according to one embodiment of the present invention. In some such embodiments, the many walls form a more-continuous crystal structure from which to start the lateral epitaxial growth of diamond on the reverse face of diamond layer 220". The cross-sectional plan view shown in FIG. 2C3 represents cross-section along dash-dot line 2C2/2C3 of FIG. 2C1 when silicon walls are used to obtain the desired epitaxial structure on the reverse face.

FIG. 2C4 is a cross-sectional plan view of a circular in-process device 218 including silicon substrate 213 (not shown in this figure), circumferential silicon wall 264 and diamond layer 220, according to one embodiment of the present invention. In some such embodiments, the single circumferential wall leaves a large uninterrupted diamond layer over which single-crystal silicon can be epitaxially grown laterally toward the center of the reverse face. In the embodiment shown, the substrate is circular in shape. In other embodiments, other starting shapes are used. The cross-sectional plan view shown in FIG. 2C4 represents cross-section along dash-dot line 2C4/2C6 of FIG. 2C5 when a single circular silicon wall is used to obtain the desired epitaxial structure on the reverse face.

Figure 4A:
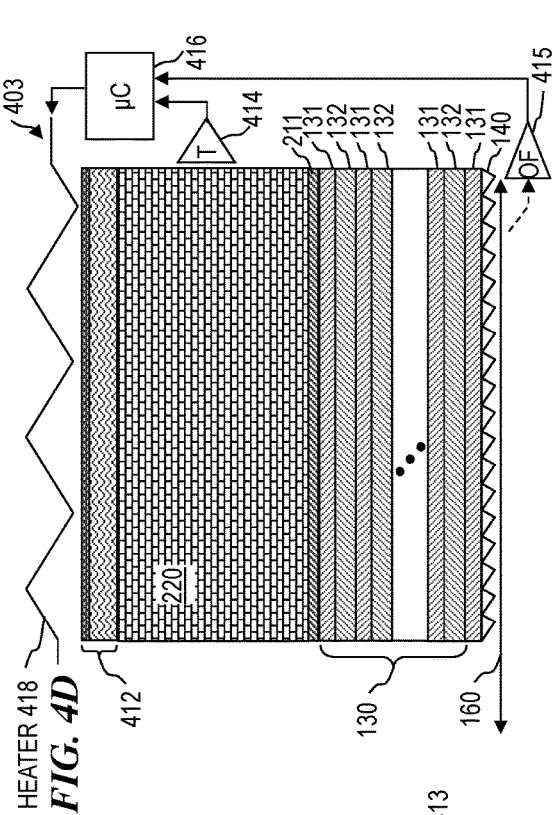
FIG. 4A is a cross-sectional side view of an in-process device 400, which has been fabricated with a high-efficiency flat grating 140, according to one embodiment of the present invention.
Figure 4B:
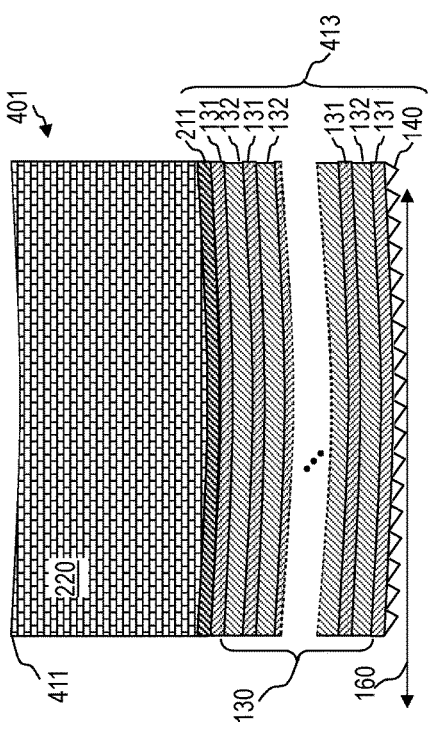
FIG. 4B is a cross-sectional side view of an in-process device 401, which has been heated or cooled to a predetermined warp temperature that establishes a pre-warp condition, according to one embodiment of the present invention.
Figure 4C:
FIG. 4C is a cross-sectional side view of an in-process device 402, which has been heated or cooled to a predetermined warp temperature that establishes a pre-warp condition, and a CTE-compensation layer 412 deposited while in the pre-warp condition, according to one embodiment of the present invention.
Figure 4D:
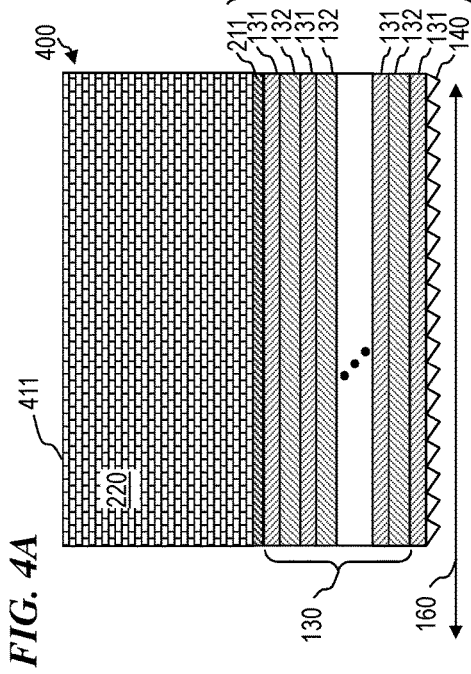
FIG. 4D is a cross-sectional side view of an in-process device 403, which has been heated or cooled to a predetermined warp temperature that establishes a pre-warp condition, a CTE-compensation layer 412 deposited while in the pre-warp condition, and the device put into operation at an operating temperature that removes the pre-warp geometry, according to one embodiment of the present invention.
Figure 5:
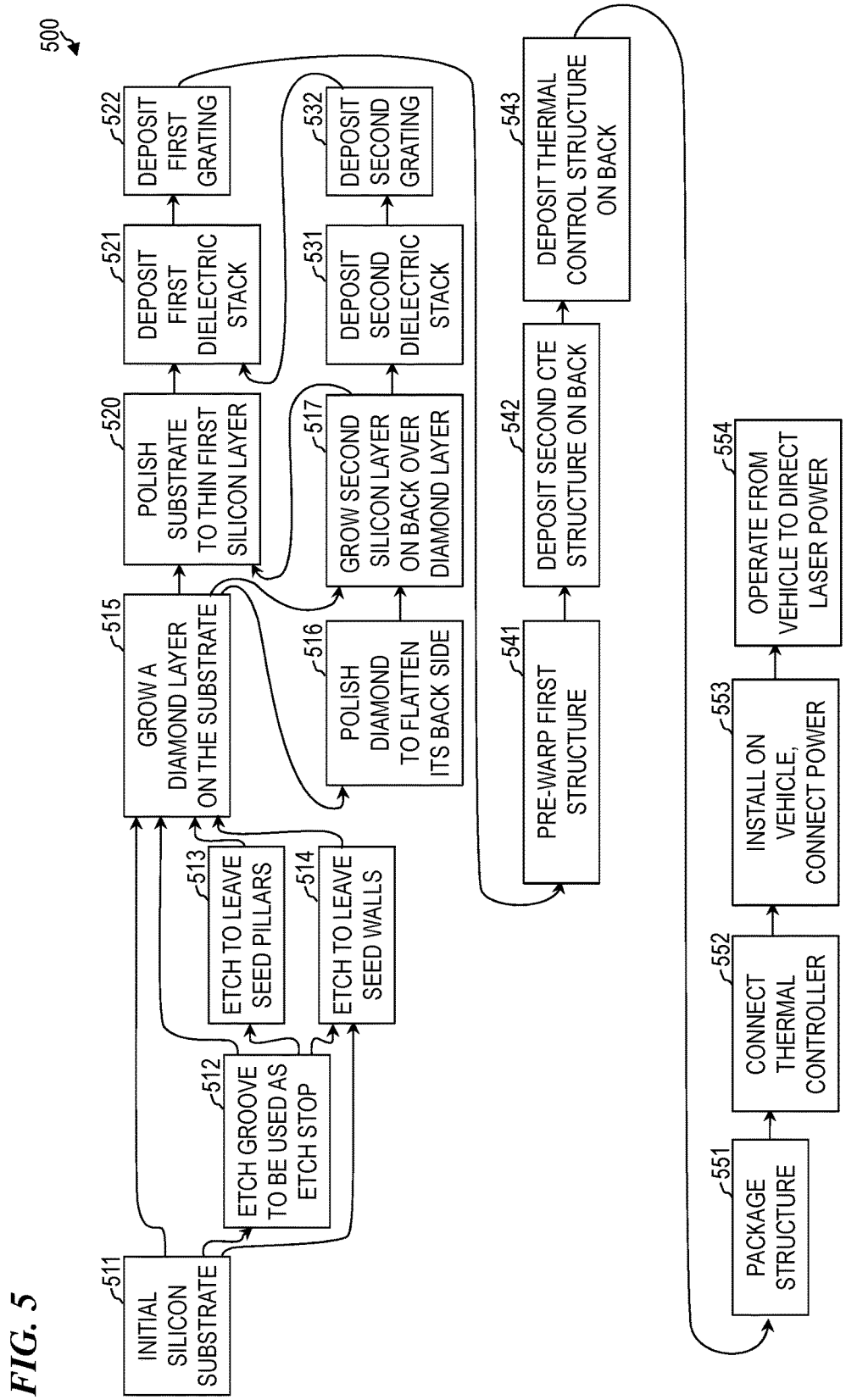

FIG. 2C5 is a cross-sectional side view of an in-process device 218 (in the case where the plan view is as shown in FIG. 2C4) or 218' (in the case where the plan view is as shown in FIG. 2C6) including silicon substrate 213, circumferential silicon wall 264 and diamond layer 220, according to one embodiment of the present invention. In some such embodiments, the reverse face (top face in this figure) of diamond layer 220 is polished flat. In some such embodiments, a silicon layer is then epitaxially grown laterally over the entire reverse (top in this figure) face of diamond layer 220. In some such embodiments, the laterally grown silicon on the reverse face and the silicon substrate 213 are polished until both are of equal thickness and at least the obverse silicon face is optically flat, so as to provide the best starting surface on which to deposit the plurality 130 of dielectric-layer pairs and the grating 140 shown in other figures. The cross-sectional side view shown in FIG. 2C5 represents cross-section along dash-dot line 2C5 of FIG. 2C4 or 2C6 before the obverse silicon face (the bottom face in this figure) has been polished to a desired thinness.

FIG. 2C6 is a cross-sectional plan view of a square in-process device 218' including silicon substrate 213 (not shown in this figure), perimeter silicon wall 264 and diamond layer 220, according to one embodiment of the present invention. This device is otherwise similar to device 218 described above. The cross-sectional plan view shown in FIG. 2C6 represents cross-section along dash-dot line 2C4/2C6 of FIG. 2C5 when a single square silicon wall is used to obtain the desired epitaxial structure on the reverse face.

FIG. 2D is a cross-sectional side view of an in-process device 204 including a thin remaining layer 211 of the original silicon substrate 210, a plurality of silicon posts that remained after etching starting substrate 210, and diamond layer 220, according to one embodiment of the present invention. The cross-sectional side view shown in FIG. 2D represents cross-section along dash-dot line 2C1 of FIG. 2C2 or 2C3 after the obverse silicon face (the bottom face in this figure) has been polished to a desired thinness.

FIG. 2E is a cross-sectional side view of an in-process device 205 including a thin remaining layer 211 of the original silicon substrate 210 and diamond layer 220, with an additional deposited silicon layer 212, according to one embodiment of the present invention.

FIG. 2F is a cross-sectional side view of an in-process device 206 including a thin remaining layer 211 of the original silicon substrate 210 and diamond layer 220, with an additional deposited silicon layer 212, and a plurality 130 of pairs 131 and 132 of dielectric layers and a grating 140, according to one embodiment of the present invention.

FIG. 2G is a cross-sectional side view of an in-process device 207 including a thin remaining layer 211 of the original silicon substrate 210 and diamond layer 220, with an additional deposited silicon layer 212, and a plurality 130 of pairs 131 and 132 of dielectric layers and a grating 140, according to one embodiment of the present invention. In some embodiments, the thicknesses of the pairs of dielectric layers 130 and 131 are varied in order to obtain a best compromise grating efficiency over a wider range of different wavelengths used by the plurality of input lasers whose beams are SBC combined by the output grating, as is described in some of the various patents incorporated herein by reference. In some embodiments, the angles of the walls (those walls facing to the lower left in the figure versus those walls facing to the lower right in the figure) of the sawtooth cross section of the grating relative to the overall plane of the obverse face are chosen to obtain the best possible diffraction efficiency for the desired set of wavelengths that are combined using SBC, as is described in some of the various patents incorporated herein by reference. In other embodiments (not shown), grating 140 is not blazed (not sawtoothed in cross section), as is described in some of the various patents incorporated herein by reference.

FIG. 2H1 is a cross-sectional side view of an in-process device 208 including a thin remaining layer 211 of the original silicon substrate 210 and diamond layer 220, with an additional deposited silicon layer 212, and a plurality 130 of pairs 131 and 132 of dielectric layers and a grating 140, according to one embodiment of the present invention.

FIG. 2H2 is a cross-sectional side view of an in-process device 209 including a thin remaining layer 211 of the original silicon substrate 210 and diamond layer 220, with an additional deposited silicon layer 212, a plurality 130 of pairs 131 and 132 of dielectric layers and a grating 140 on one face (the lower face in this figure), and a plurality 130' of pairs 131' and 132' of dielectric layers and a grating 140' on an opposite face (the upper face in this figure), according to one embodiment of the present invention. In some embodiments, the device 209 of FIG. 2H2 is identical to device 208 of FIG. 2H1, but without the posts or walls internal to the circumferential wall 264. In some embodiments, circumferential wall 264 is ground off or otherwise removed in order to produce the final device.

Figure 3B:
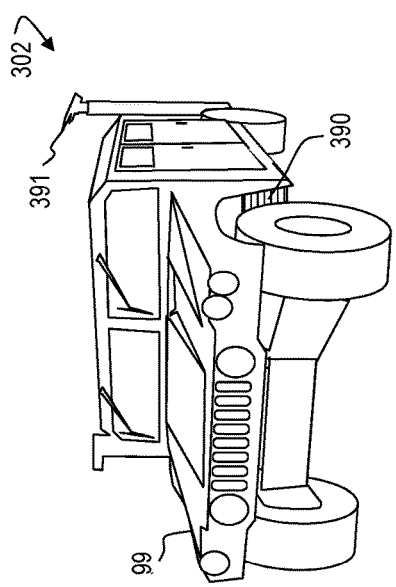
FIG. 3B is a perspective view of a mobile land-vehicle-based defensive system 302 that uses a high-energy defensive device 391 that includes a multi-layer-dielectric-based grating on a thin remaining silicon layer 211 and diamond layer 220, according to one embodiment of the present invention.
Figure 3A:
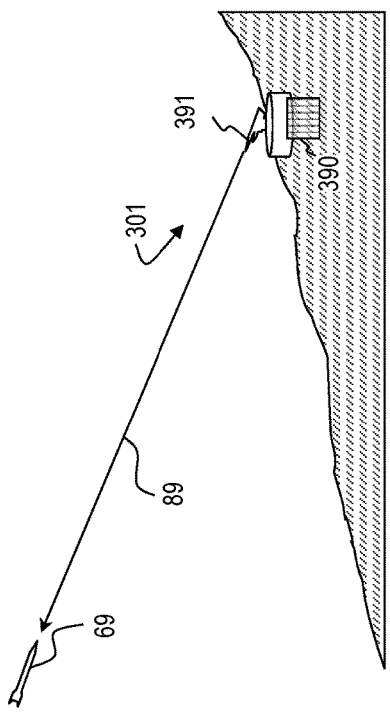
FIG. 3A is a perspective view of a land-based defensive system 301 that uses a high-energy defensive device 391 that includes a multi-layer-dielectric-based grating on a thin remaining silicon layer 211 and diamond layer 220, according to one embodiment of the present invention.

FIG. 3A is a perspective view of a land-based defensive system that uses a high-energy defensive point-able SBC device 391 that includes a multi-layer-dielectric-based grating on a thin remaining silicon layer 211 and diamond layer 220, according to one embodiment of the present invention. In some embodiments, a laser system 390 having a plurality of high-power lasers (e.g., in some embodiments, optically pumped rare-earth-doped fiber lasers, as are described in some of the various patents incorporated herein by reference) provides a plurality of very high-power laser beams (e.g., in some embodiments, one megawatt or more each), each having a different wavelength, that are combined using SBC into a single extra high-power output beam. In some embodiments, the single extra high-power output beam is used as a directed-energy beam to protect against incoming missiles or aircraft. In some embodiments, the single extra high-power output beam is used as a communications beam to communicate with aircraft, or seacraft, submarines or other vehicles. In some embodiments, laser system 390 and SBC device 391 are housed in a terrestrial building.

FIG. 3B is a perspective view of a mobile land-vehicle-based defensive system that uses a high-energy defensive device 391 that includes a multi-layer-dielectric-based grating on a thin remaining silicon layer 211 and diamond layer 220, according to one embodiment of the present invention. In some embodiments, the single extra high-power output beam is used as a directed-energy beam to protect against incoming missiles or aircraft, or ground-based tanks or other vehicles. In some embodiments, the single extra high-power output beam is used as a communications beam to communicate with aircraft, or seacraft, submarines or other vehicles. In some embodiments, laser system 390 and SBC device 391 are housed in a mobile vehicle such as a humvee or tank.

Figure 3C:
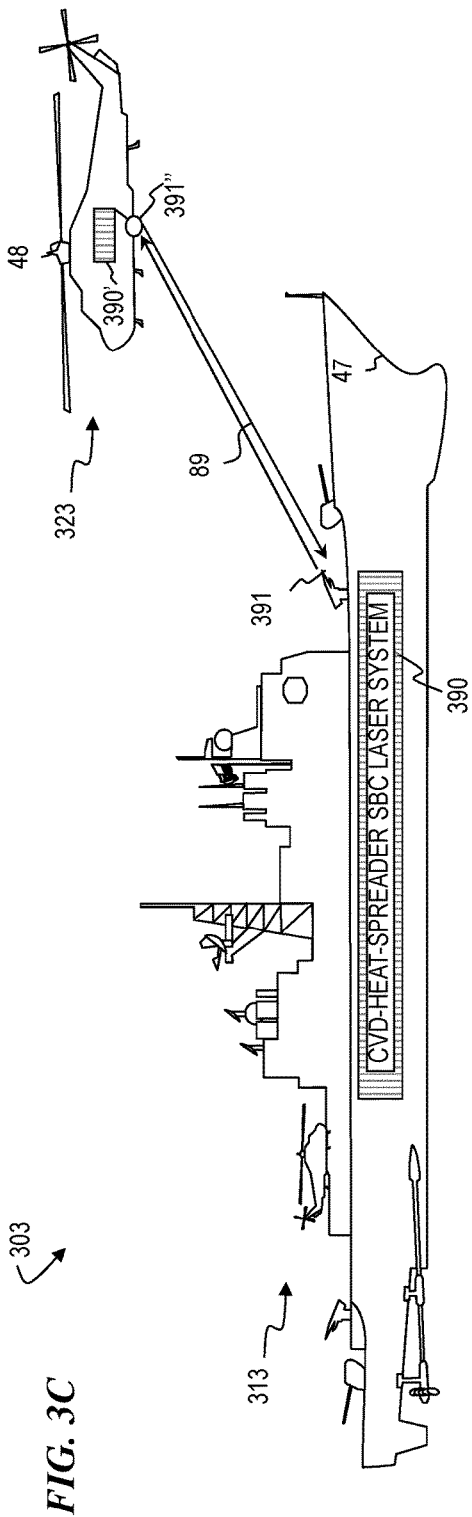
FIG. 3C is a perspective view of a mobile sea- and/or aircraft-vehicle-based defensive system 303 that uses high-energy defensive device 391 and/or 391' that each include a multi-layer-dielectric-based grating on a thin remaining silicon layer 211 and diamond layer 220, according to one embodiment of the present invention.

FIG. 3C is a perspective view of a mobile sea- and/or aircraft-vehicle-based defensive system that uses high-energy defensive device 391 and/or 391' that each includes a multi-layer-dielectric-based grating on a thin remaining silicon layer 211 and diamond layer 220, according to one embodiment of the present invention. In some embodiments, the single extra high-power output beam is used as a directed-energy beam to protect against incoming missiles or aircraft, or seacraft, submarines or other vehicles. In some embodiments, the single extra high-power output beam is used as a communications beam to communicate with aircraft, or seacraft, submarines or other vehicles. In some embodiments, laser system 390 and SBC device 391 are housed in a ship such as a destroyer, aircraft carrier, or frigate, or in an aircraft such as a fighter jet or helicopter.

FIG. 4A is a cross-sectional side view of an in-process device 400, which has been fabricated with a high-efficiency flat grating 140, according to one embodiment of the present invention. In some embodiments, device 400 has a flat geometry (i.e., the outer surface of grating 140 is parallel to flat plane 160) at some given temperature (e.g., in some embodiments, the given temperature is the temperature at which grating 140 was formed on the outer surface (in FIG. 4A, this is the bottom surface) of dielectric stack 130. In some embodiments, this device 400 is formed in like manner to device 209 of FIG. 2H2 or device 106 of FIG. 1H, but without the reverse-side additional deposited silicon layer 112, without the reverse-side dielectric stack 130' and without reverse-side grating 140'. Thus, the reverse-side surface 411 of diamond layer 220 is exposed. In some embodiments, reverse face 411 is polished flat and substantially parallel to the obverse face of grating 140. In some embodiments (not shown), reverse-side silicon layer 212 is applied to reverse face 411.

FIG. 4B is a cross-sectional side view of an in-process device 401 including a thin remaining layer 211 of the original silicon substrate 210 and diamond layer 220, and a plurality 130 of pairs 131 and 132 of dielectric layers and a grating 140 on the obverse face, but no reverse-side layers or grating. At this point in fabrication, device 401 is device 400 that has been brought to thermal equilibrium at a predetermined warp temperature (heated to a raised temperature or cooled to a lower temperature as compared to the temperature of device 400 of FIG. 4A) that establishes a pre-warp condition, according to one embodiment of the present invention. In some embodiments, the predetermined warp temperature is different than the deposition temperature(s) at which the plurality 130 of pairs 131 and 132 of dielectric layers and the grating 140 were deposited and/or different than the polishing temperature at which the majority of silicon substrate 213 was removed and polished. In some embodiments, the device 401 is substantially flat (as shown in FIG. 4A) during polishing and deposition of the dielectric layers 130 and the grating 140, but when heated or cooled to a different temperature profile (here called the "predetermined warp temperature profile"), the device 401 distorts (warps) to a convex shape at the obverse grating face (the bottom face as shown in FIG. 4A). In other embodiments (not shown, but conceptually similar, the device 401 distorts (warps) to a concave shape at the obverse grating face when heated or cooled to the predetermined warp temperature. The predetermined warp temperature profile is that temperature profile at which the amount and geometry of convex or concave warp will be counteracted or compensated by reverse-side compensation layer(s) 412 described below. In some embodiments, the predetermined warp temperature profile is a uniform single temperature that is different than the temperature at which grating structure 413 was fabricated. In other embodiments, the predetermined warp temperature profile has a radial temperature gradient (with a higher or lower temperature in the center, and a rate of temperature change over radial distance that causes a particular warp geometry (e.g., spherical versus parabolic) that will be compensated for by compensation structure 412 described below.

FIG. 4C is a cross-sectional side view of an in-process device 402 including a thin remaining layer 211 of the original silicon substrate 210 and diamond layer 220 (but with no additional deposited silicon layer 212 as was shown in FIG. 2H2 for example), and a plurality 130 of pairs 131 and 132 of dielectric layers and a grating 140, and which has been heated or cooled to a predetermined warp temperature that establishes a pre-warp condition (concave or convex shape such as a spherical or parabolic obverse surface), at which a CTE-compensation structure 412 has been deposited onto reverse surface 411 while in the pre-warp geometry, according to one embodiment of the present invention.

FIG. 4D is a cross-sectional side view of an in-process device 403 including a thin remaining layer 211 of the original silicon substrate 210 and diamond layer 220 (but with no additional deposited silicon layer 212 as was shown in FIG. 2H1 for example), and a plurality 130 of pairs 131 and 132 of dielectric layers and a grating 140, and which has been heated or cooled to a predetermined warp temperature that establishes the pre-warp condition, and the CTE-compensation layer or structure 412 has been deposited while in the pre-warp condition, and the device put into operation at an operating temperature that removes the pre-warp geometry, according to one embodiment of the present invention. In some embodiments, a heater/cooler 418 is controlled by controller 416 (e.g., a microprocessor or feedback-controlled electronics), which receives feedback from one or more sources (e.g., temperature sensor 414 and/or optical-flatness sensor 415) and controller 416 drives heater/cooler 418 to maintain the temperature of device 403 when the laser beams (which are impinging on grating 140 to be spectral-beam combined) are off or at low power to be at the same temperature as when the laser beams are at full operating power. In some embodiments, for example, optical-flatness sensor 415 includes a video imager that examines a reflection pattern of visible, or other suitable wavelength(s) of, light shown on the surface at an oblique angle (or a pattern of diffracted light of some convenient wavelength (for example, light from a visible wavelength laser)). In this way, grating device 403 is kept at the temperature at which the grating is flat, whether or not the laser beams are heating the grating device 403 (for example, in some embodiments, the heater 418 is on and heating when the laser beams are off or at low power, but the heater 418 is off and not heating when the laser beams are on, such that one or the other is providing just enough heating to keep the grating device 403 flat and thus operating to provide the best possible output beam quality of the combined laser beams.

FIG. 5 is a block diagram of a system 500 for making and using the present invention, according to some embodiments of the present invention. FIG. 5 also represents a method for making and using the present invention, according to some embodiments of the present invention. In some embodiments, system 500 provides an initial silicon wafer substrate 511. In some embodiments, unit 512 (such as conventional semiconductor lithography and processing equipment well known in the art and commonly used to process integrated circuits or micro-electro-mechanical system (MEMS) devices, or the like) etches a groove (e.g., in some embodiments, a groove such as 1101 of FIG. 1A2 that surrounds an area on the wafer 511) into the reverse side (surface 1103 of FIG. 1A2, which will be the face that will be furthest from the operational optical diffraction grating of the final product) of the silicon wafer 511. In some embodiments, the grooved wafer is then processed by diamond-deposition apparatus 515, which deposits a layer of diamond in the groove and across surface 1103 of the substrate 1102 of FIG. 1A2. In some embodiments, the wafer 511 or the grooved wafer resulting from processing by unit 512 is patterned and etched by unit 512 to leave a plurality of silicon pillars (e.g., pillars 214' of FIG. 2C2) that are used as crystal seeds in the growing of the backside silicon layer (e.g., layer 212 of FIG. 2E). In some embodiments, the wafer 511 or the grooved wafer resulting from processing by unit 512 is patterned and etched by unit 512 to leave a plurality of silicon walls (e.g., walls 214" of FIG. 2C3) that are used as crystal seeds in the growing of the backside silicon layer (e.g., layer 212 of FIG. 2E). In some embodiments, the wafer having no grooves, pillars or walls (e.g., direct path from 511 to 515), or having grooves and/or pillars and/or walls is then processed by diamond-deposition apparatus 515 (e.g., in some embodiments, CVD equipment), which deposits a layer of diamond in the groove (if there is a groove) and across surface 1103 of the substrate 1102 of FIG. 1A2. In some embodiments, unit 516 polishes the reverse side (the outer face of the grown diamond layer) to flatten and/or smooth it, so that unit 517 has a smooth surface to grow the second layer of silicon on the reverse side. In other embodiments, the second layer of silicon is deposited directly on the as-grown diamond layer. In some embodiments, polishing unit 520 thins the silicon wafer to leave only a very thin layer of silicon (e.g., in some embodiments, having a thickness determined by the ridges of diamond deposited in the grooves from unit 512) on the obverse face. In some embodiments, unit 521 deposits a plurality of successive pairs of dielectric material as described above. In some embodiments, unit 522 deposits a first grating (e.g., the operational grating) as described above. In some embodiments, units 531 and 532 deposit a plurality of successive pairs of dielectric material and a second grating on the reverse side; e.g., in some embodiments, these are used to provide substantially or identical CTE as the structure on the obverse side. In some embodiments, the units 521 and 531 are a single unit that deposit dielectric layers on both the obverse and reverse faces as a single operation and/or simultaneously to avoid going back and forth relative to the grating depositing. In some embodiments, the units 522 and 532 are a single unit that deposit gratings on both the obverse and reverse faces as a single operation, as successive operations, and/or simultaneously to avoid going back and forth relative to the dielectric depositing. In some embodiments, unit 541 applies a pre-warp shape (see the description of FIG. 4B), and unit 542 deposits a backside structure (see FIG. 4C) to compensate for the CTE differences between the other layers. In some embodiments, unit 543 applies a thermal-adjustment device (e.g., one that heats or cools, or selectively heats and cools as necessary to keep the device at a temperature that controls and maintains the flatness of the operational grating. In some embodiments, unit 551 packages the structure resulting from the above operations, and unit 552 connects a thermal controller (e.g., a microprocessor and its various sensors) that controls the thermal-adjustment device). In some embodiments, unit 553 installs the grating and its packaging and/or controller on a vehicle (such as shown in FIGS. 3A-3C described above). In some embodiments, operation 554 is operating the device as part of a directed-energy system, typically for defense from hostile operatives.

In some embodiments, the present invention provides a method that includes: providing a silicon substrate having a thickness; growing a diamond layer on the substrate; thinning the silicon substrate and flattening an obverse face of the silicon to leave a very first layer of flattened silicon on an obverse face of the diamond layer; and forming a first layered structure, wherein the forming of the first structure includes: depositing a first stack on the flattened obverse face of the first thin layer of flattened silicon on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack.

In some embodiments, the flattening includes polishing. In some embodiments, the flattening includes diamond machining (such as turning on a lathe and cutting the surface using a diamond tool). In some embodiments, the flattening includes chemical-mechanical polishing.

Some embodiments of the method further include depositing a second structure having at least one layer on a reverse face of the diamond layer to provide a warping compensation for differences in coefficients of thermal expansion between the diamond layer and the first layered structure.

Some embodiments of the method further include: pre-warping the first structure; and depositing a second structure having at least one layer on a reverse face of the pre-warped first structure to provide a warping compensation for differences in coefficients of thermal expansion between the diamond layer and the first stack and the first diffraction grating.

Some embodiments of the method further include: pre-warping the first structure; depositing a second structure having at least one layer on a reverse face of the pre-warped first structure; depositing a temperature-change element on the second structure; and controlling the temperature-change element to provide a warping compensation for differences in coefficients of thermal expansion between the diamond layer and the first stack and the first diffraction grating.

Some embodiments of the method further include forming a silicon layer on a reverse face of the diamond layer.

Some embodiments of the method further include: forming a second silicon layer on a reverse face of the diamond layer; flattening the second silicon layer on the reverse face of the diamond layer to leave a thin layer of flattened silicon on the diamond layer; depositing a second stack on the flattened reverse face of the thin layer of flattened second silicon layer on the reverse face of the diamond layer, wherein the second stack includes a plurality of pairs of dielectric layers, wherein each pair of the plurality of pairs of dielectric layers of the second stack includes a first layer having a first index of refraction value and a second layer having a second index of refraction value that is different than the first index of refraction value; and forming a diffraction grating on an outer surface of the second stack.

Some embodiments of the method further include forming a groove along a perimeter of an area of the silicon substrate before the growing of the diamond layer on the substrate, wherein the growing of the diamond layer on the substrate deposits a ridge of diamond in the groove, and wherein the flattening of the obverse face of the silicon includes polishing and using the ridge of diamond as a polishing-stop structure, and wherein a depth of the groove determines a thickness of the first thin silicon layer.

Some embodiments of the method further include: patterning the silicon substrate; etching the patterned silicon substrate to leave an array of silicon pillars on a face of the silicon substrate before the growing of the diamond layer on the substrate; and forming a second silicon layer on a reverse face of the diamond layer using the array of silicon pillars as crystal seeds to help form at least a portion of the second silicon layer as a single-crystal structure.

Some embodiments of the method further include: patterning the silicon substrate; etching the patterned silicon substrate to leave an array of silicon pillars on a face of the silicon substrate before the growing of the diamond layer on the substrate; and forming a second silicon layer on a reverse face of the diamond layer using the array of silicon pillars as crystal seeds to help form at least a portion of the second silicon layer as a single-crystal structure.

In some embodiments, the present invention provides an apparatus that includes: a thin optically flat first silicon layer; a diamond layer on the first silicon layer; and a first layered structure on the first silicon layer; wherein the first layered structure includes: a first stack on the first silicon layer, wherein the first stack includes a plurality of pairs of dielectric layers on the thin layer of flattened silicon, wherein each pair of the plurality of pairs of dielectric layers includes a first layer that has a first index of refraction value and a second layer that has a second index of refraction value that is different than the first index of refraction value, and a first diffraction grating on an outer surface of the first stack.

Some embodiments of the apparatus further include a second structure that has at least one layer, affixed on a reverse face of the diamond layer to provide a warp compensation for differences in coefficients of thermal expansion between the diamond layer and the first layered structure.

In some embodiments of the apparatus, the first structure is pre-warped, and wherein the apparatus further includes a second structure that has at least one layer on a reverse face of the pre-warped first structure to provide a warp compensation for differences in coefficients of thermal expansion between the diamond layer and the first layered structure.

In some embodiments of the apparatus, the first structure is pre-warped, and the apparatus further includes: a second structure that has at least one layer on a reverse face of the pre-warped first structure; a temperature-change element on the second structure; and a controller operatively coupled to control the temperature-change element to provide a warp-compensation for differences in coefficients of thermal expansion between the diamond layer and the first layered structure.

Some embodiments of the apparatus further include a second silicon layer on a reverse face of the diamond layer.

Some embodiments of the apparatus further include a thin optically flat second silicon layer on a reverse face of the diamond layer; a second stack on a reverse face of the thin layer of flattened silicon on the reverse face of the diamond layer, wherein the second stack includes a plurality of pairs of dielectric layers, wherein each pair of the plurality of pairs of dielectric layers of the second stack includes a first layer that has a first index of refraction value and a second layer that has a second index of refraction value that is different than the first index of refraction value; and a diffraction grating on an outer surface of the second stack.

In some embodiments of the apparatus, the diamond layer includes a ridge of diamond that serves as a polishing-stop structure (since diamond is harder than silicon, a polishing operation that removes silicon will stop when it reaches the diamond ridge; this usually also helps make the silicon layer remaining as uniformly thick if the polishing reaches one edge earlier than the other, so the polishing continues on the side opposite the location that reached the diamond ridge first), and wherein a height of the ridge equals a thickness of the thin optically flat first silicon layer.

Some embodiments of the apparatus further include an array of silicon pillars on a reverse face of the thin optically flat first silicon layer, wherein the array of silicon pillars extend through a thickness of the diamond layer; and a second silicon layer on a reverse face of the diamond layer, wherein at least some of the array of silicon pillars and at least a portion the second silicon layer are a single-crystal structure.

Some embodiments of the apparatus further include a plurality of silicon walls on a reverse face of the thin optically flat first silicon layer, wherein the plurality of silicon walls extend through a thickness of the diamond layer; and a second silicon layer on a reverse face of the diamond layer, wherein at least some of the plurality of silicon walls and at least a portion the second silicon layer are a single-crystal structure.

In some embodiments, the present invention provides an apparatus that includes: means for growing a diamond layer on a substrate; means for removing most of the substrate and means for flattening an obverse face of the substrate to leave a very thin layer of flattened material on the diamond layer; means for depositing a stack on the diamond layer, wherein the stack includes a plurality of pairs of dielectric layers on the thin layer of flattened material, wherein each pair of the plurality of pairs of dielectric layers includes a first layer having a first index of refraction value and a second layer having a second index of refraction value that is different than the first index of refraction value; and means for forming a diffraction grating on an outer surface of the stack. Some such embodiments of this apparatus further include means for pre-warping the first structure; means for depositing a second structure having at least one layer on a reverse face of the pre-warped first structure; and means for depositing a temperature-change element on the second structure.

In some embodiments, the present invention provides a method that includes: providing a non-diamond substrate having a thickness; growing a diamond layer on the substrate; thinning the substrate and flattening an obverse face of the substrate to leave a very first non-diamond flattened layer on an obverse face of the diamond layer; and forming a first layered structure, wherein the forming of the first structure includes: depositing a first stack on the flattened obverse face of the first thin layer of flattened non-diamond material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack. Some embodiments of this method further include: depositing a second structure having at least one layer on a reverse face of the diamond layer to provide a warping compensation for differences in coefficients of thermal expansion between the diamond layer and the first layered structure. Some embodiments of the method further include: pre-warping the first structure; and depositing a second structure having at least one layer on a reverse face of the pre-warped first structure to provide a warping compensation for differences in coefficients of thermal expansion between the diamond layer and the first stack and the first diffraction grating. Some embodiments of the method further include: pre-warping the first structure; depositing a second structure having at least one layer on a reverse face of the pre-warped first structure; depositing a temperature-change element on the second structure; and controlling the temperature-change element to provide a warping compensation for differences in coefficients of thermal expansion between the diamond layer and the first stack and the first diffraction grating. In some embodiments, the present invention provides a method that includes: providing a non-diamond substrate having a thickness; growing a diamond layer on the substrate; depositing a layer of non-diamond material on top of the diamond layer; flattening the non-diamond material to leave a very first flattened layer on an obverse face of the diamond layer; and forming a first layered structure, wherein the forming of the first structure includes: depositing a first stack on the flattened obverse face of the first thin layer of flattened non-diamond material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack. Some embodiments of the method further include: depositing a silicon layer as the non-diamond material layer.

In some embodiments, the present invention provides a method that includes providing a substrate having a thickness; growing a diamond layer on the substrate; thinning the substrate and flattening an obverse face of the substrate to leave a thin first layer of flattened material on an obverse face of the diamond layer; and forming a first layered structure, wherein the forming of the first structure includes: depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack.

Some embodiments of this method further include depositing a second structure having at least one layer on a reverse face of the diamond layer to provide a warping compensation for differences in coefficients of thermal expansion between the diamond layer and the first layered structure. Some embodiments further include pre-warping the first structure; and depositing a second structure having at least one layer on a reverse face of the pre-warped first structure to provide a warping compensation for differences in coefficients of thermal expansion between the diamond layer and the first stack and the first diffraction grating. Some embodiments further include: pre-warping the first structure; depositing a second structure having at least one layer on a reverse face of the pre-warped first structure; depositing a temperature-change element on the second structure; and controlling the temperature-change element to provide a warping compensation for differences in coefficients of thermal expansion between the diamond layer and the first stack and the first diffraction grating. In some embodiments, the thin first layer of flattened material includes a polished silicon layer on a reverse face of the diamond layer. Some embodiments further include forming a second silicon layer on a reverse face of the diamond layer; polishing the second silicon layer on the reverse face of the diamond layer to leave a thin layer of polished silicon on the diamond layer; and depositing a second stack on the polished reverse face of the thin layer of polished second silicon layer on the reverse face of the diamond layer, wherein the second stack includes a plurality of pairs of dielectric layers, wherein each pair of the plurality of pairs of dielectric layers of the second stack includes a first layer having a first index of refraction value and a second layer having a second index of refraction value that is different than the first index of refraction value.

In some embodiments, the substrate includes a silicon face, and the method further includes forming a groove along a perimeter of an area of the silicon face of the substrate before the growing of the diamond layer on the substrate, wherein the growing of the diamond layer on the substrate deposits a ridge of diamond in the groove, and wherein the flattening of the obverse face of the silicon face includes polishing and using the ridge of diamond as a polishing-stop structure, and wherein a depth of the groove determines a thickness of the first thin silicon layer. In some embodiments, the substrate includes a silicon face, and the method further includes patterning the silicon face of the substrate; etching the patterned silicon substrate to leave an array of silicon pillars on the silicon face of the substrate before the growing of the diamond layer on the substrate; and forming a second silicon layer on a reverse face of the diamond layer using the array of silicon pillars as crystal seeds to help form at least a portion of the second silicon layer as a single-crystal structure. \In some embodiments, the substrate includes a silicon face, and the method further includes patterning the silicon face of the substrate; etching the patterned silicon face of the substrate to leave an array of silicon pillars on a face of the silicon face of the substrate before the growing of the diamond layer on the substrate; and forming a second silicon layer on a reverse face of the diamond layer using the array of silicon pillars as crystal seeds to help form at least a portion of the second silicon layer as a single-crystal structure.

In some embodiments, the present invention provides an apparatus that includes a thin optically flat first layer of material; a diamond layer on the first layer of material; and a first layered structure on the first layer of material; wherein the first layered structure includes: a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and a first diffraction grating on an outer surface of the first stack. Some embodiments further include a second structure that has at least one layer on a reverse face of the diamond layer to provide a warp compensation for differences in coefficients of thermal expansion between the diamond layer and the first layered structure. In some embodiments, the first structure is pre-warped, and wherein the apparatus further includes a second structure that has at least one layer on a reverse face of the pre-warped first structure to provide a warp compensation for differences in coefficients of thermal expansion between the diamond layer and the first layered structure. In some embodiments, the first structure is pre-warped, and wherein the apparatus further includes: a second structure that has at least one layer on a reverse face of the pre-warped first structure; a temperature-change element on the second structure; and a controller operatively coupled to control the temperature-change element to provide a warping compensation for differences in coefficients of thermal expansion between the diamond layer and the first layered structure. Some embodiments further include a second layer of material on a reverse face of the diamond layer. In some embodiments, the first layer of material is silicon, and the apparatus further includes: a thin optically flat second silicon layer on a reverse face of the diamond layer; and a second stack on a reverse face of the optically flat second silicon layer on the reverse face of the diamond layer, wherein the second stack includes a plurality of pairs of dielectric layers, wherein each pair of the plurality of pairs of dielectric layers of the second stack includes a first layer that has a first index of refraction value and a second layer that has a second index of refraction value that is different than the first index of refraction value. In some embodiments, the diamond layer includes a ridge of diamond, and wherein a height of the ridge equals a thickness of the thin optically flat first layer of material. In some embodiments, the first layer of material is silicon, and the apparatus further includes: an array of silicon pillars on a reverse face of the thin optically flat first silicon layer, wherein the array of silicon pillars extend through a thickness of the diamond layer; and a second silicon layer on a reverse face of the diamond layer, wherein at least some of the array of silicon pillars and at least a portion the second silicon layer are a single-crystal structure. In some embodiments, the first layer of material is silicon, and the apparatus further includes: a plurality of silicon walls on a reverse face of the thin optically flat first silicon layer, wherein the plurality of silicon walls extend through a thickness of the diamond layer; and a second silicon layer on a reverse face of the diamond layer, wherein at least some of the plurality of silicon walls and at least a portion the second silicon layer are a single-crystal structure.

In some embodiments, the present invention provides an apparatus for fabricating a grating on a silicon substrate, the apparatus including: means for growing a diamond layer on the substrate; means for removing most of the silicon substrate and means for flattening an obverse face of the substrate to leave a very thin layer of flattened material on the diamond layer; means for depositing a stack on the diamond layer, wherein the stack includes a plurality of pairs of dielectric layers on the thin layer of flattened material, wherein each pair of the plurality of pairs of dielectric layers includes a first layer having a first index of refraction value and a second layer having a second index of refraction value that is different than the first index of refraction value; and means for forming a diffraction grating on an outer surface of the stack. Some embodiments further include means for pre-warping the first structure; means for depositing a second structure having at least one layer on a reverse face of the pre-warped first structure; and means for depositing a temperature-change element on the second structure.

In some embodiments, the present invention provides a method that includes providing a substrate having a thickness; growing a diamond layer on the substrate; thinning the substrate and flattening an obverse face of the substrate to leave a thin first layer of flattened material on an obverse face of the diamond layer; second flattened layer and forming a first layered structure, wherein the forming of the first structure includes: depositing a first stack on the flattened reverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack. In some embodiments, the first thin layer of material is the remains of a mostly sacrificial silicon wafer used to grow the diamond layer.

In some embodiments, the present invention provides a method that includes providing a wafer that includes a diamond layer and a thin layer of non-diamond material on the diamond layer; flattening an obverse face of the non-diamond material to leave a thin first layer of flattened non-diamond material on an obverse face of the diamond layer; and forming a first layered structure, wherein the forming of the first structure includes: depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack. In some embodiments, the first thin layer of material is the remains of a mostly sacrificial silicon wafer used to grow the diamond layer.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical, position of an item in a sequence or layer in a stack of layers, nor temporal requirements on their objects.

What is claimed is:

1. A method comprising:
providing a wafer that includes a diamond layer and a thin layer of non-diamond material on the diamond layer;
flattening an obverse face of the non-diamond material to leave a thin first layer of flattened non-diamond material on an obverse face of the diamond layer;
forming a first layered structure, wherein the forming of the first structure includes:
depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and
forming a first diffraction grating on an outer surface of the first stack; and
depositing a second structure having at least one layer on a reverse face of the diamond layer to provide a warping compensation for differences in coefficients of thermal expansion between the diamond layer and the first layered structure, wherein the first layered structure includes the thin first layer of flattened non-diamond material, the first stack of pairs of dielectric layers and the first diffraction grating.

2. A method comprising:
providing a wafer that includes a diamond layer and a thin layer of non-diamond material on the diamond layer;
flattening an obverse face of the non-diamond material to leave a thin first layer of flattened non-diamond material on an obverse face of the diamond layer;
forming a first layered structure, wherein the forming of the first structure includes:
depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and
forming a first diffraction grating on an outer surface of the first stack;
pre-warping the first layered structure; and
depositing a second structure having at least one layer on a reverse face of the pre-warped first layered structure to provide a warping compensation for differences in coefficients of thermal expansion between the diamond layer and the first stack and the first diffraction grating.

3. A method comprising:
providing a wafer that includes a diamond layer and a thin layer of non-diamond material on the diamond layer;
flattening an obverse face of the non-diamond material to leave a thin first layer of flattened non-diamond material on an obverse face of the diamond layer;
forming a first layered structure, wherein the forming of the first structure includes:
depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack; and pre-warping the first layered structure;

depositing a second structure having at least one layer on a reverse face of the pre-warped first layered structure;

depositing a temperature-change element on the second structure; and controlling the temperature-change element to provide a warping compensation for differences in coefficients of thermal expansion between the diamond layer and the first stack and the first diffraction grating.

4. A method comprising:

providing a wafer that includes a diamond layer and a thin layer of non-diamond material on the diamond layer;

flattening an obverse face of the non-diamond material to leave a thin first layer of flattened non-diamond material on an obverse face of the diamond layer; and forming a first layered structure, wherein the forming of the first structure includes:

depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack, wherein the thin first layer of flattened material includes a polished silicon layer on the obverse face of the diamond layer.

5. The method of claim 4, further comprising:

forming a second silicon layer on a reverse face of the diamond layer;

polishing the second silicon layer on the reverse face of the diamond layer to leave a thin layer of polished silicon on the diamond layer; and depositing a second stack on the polished reverse face of the thin layer of polished second silicon layer on the reverse face of the diamond layer, wherein the second stack includes a plurality of pairs of dielectric layers, wherein each pair of the plurality of pairs of dielectric layers of the second stack includes a first layer having a first index of refraction value and a second layer having a second index of refraction value that is different than the first index of refraction value.

6. A method comprising:

providing a wafer that includes a diamond layer and a thin layer of non-diamond material on the diamond layer;

flattening an obverse face of the non-diamond material to leave a thin first layer of flattened non-diamond material on an obverse face of the diamond layer; and forming a first layered structure, wherein the forming of the first structure includes:

depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack, wherein the substrate includes a silicon face, the method further comprising:

forming a groove along a perimeter of an area of the silicon face of the substrate before the growing of the diamond layer on the substrate, wherein the growing of the diamond layer on the substrate deposits a ridge of diamond in the groove, and wherein the flattening of the obverse face of the silicon face includes polishing and using the ridge of diamond as a polishing-stop structure, and wherein a depth of the groove determines a thickness of the first thin silicon layer.

7. A method comprising:

providing a wafer that includes a diamond layer and a thin layer of non-diamond material on the diamond layer;

flattening an obverse face of the non-diamond material to leave a thin first layer of flattened non-diamond material on an obverse face of the diamond layer; and forming a first layered structure, wherein the forming of the first structure includes:

depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack, wherein the substrate includes a silicon face, the method further comprising:

patterning the silicon face of the substrate;

etching the patterned silicon substrate to leave an array of silicon pillars on the silicon face of the substrate before the growing of the diamond layer on the substrate; and forming a second silicon layer on a reverse face of the diamond layer using the array of silicon pillars as crystal seeds to help form at least a portion of the second silicon layer as a single-crystal structure.

8. A method comprising:

providing a wafer that includes a diamond layer and a thin layer of non-diamond material on the diamond layer;

flattening an obverse face of the non-diamond material to leave a thin first layer of flattened non-diamond material on an obverse face of the diamond layer; and forming a first layered structure, wherein the forming of the first structure includes:

depositing a first stack on the flattened obverse face of the first thin layer of flattened material on the obverse face of the diamond layer, wherein the first stack includes a plurality of pairs of dielectric layers, wherein each pair of the plurality of pairs of dielectric layers of the first stack includes a first layer having a first index of refraction value and a second layer having a second index of refraction value that is different than the first index of refraction value, and forming a first diffraction grating on an outer surface of the first stack, wherein the substrate includes a silicon face, the method further comprising:

patterning the silicon face of the substrate;

etching the patterned silicon face of the substrate to leave an array of silicon pillars on a face of the silicon face of the substrate before the growing of the diamond layer on the substrate; and forming a second silicon layer on a reverse face of the diamond layer using the array of silicon pillars as crystal seeds to help form at least a portion of the second silicon layer as a single-crystal structure.

9. An apparatus comprising:

a thin optically flat first layer of material;

a diamond layer on the first layer of material;

a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and
 a first diffraction grating on an outer surface of the first stack; and a second structure that has at least one layer on a reverse face of the diamond layer to provide a warp compensation for differences in coefficients of thermal expansion between the diamond layer and the combination of the first layer of material and the first layered structure.

10. An apparatus comprising:

a thin optically flat first layer of material;

a diamond layer on the first layer of material;

a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and
 a first diffraction grating on an outer surface of the first stack, wherein the first layered structure is pre-warped, and wherein the apparatus further includes a second structure that has at least one layer on a reverse face of the pre-warped first structure to provide a warp compensation for differences in coefficients of thermal expansion between the diamond layer and the first layered structure.

11. An apparatus comprising:

a thin optically flat first layer of material;

a diamond layer on the first layer of material;

a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and
 a first diffraction grating on an outer surface of the first stack, wherein the first layered structure is pre-warped, and wherein the apparatus further includes:

a second structure that has at least one layer on a reverse face of the pre-warped first structure;

a temperature-change element on the second structure; and a controller operatively coupled to control the temperature-change element to provide a warping compensation for differences in coefficients of thermal expansion between the diamond layer and the first layered structure.

12. An apparatus comprising:

a thin optically flat first layer of material;

a diamond layer on the first layer of material;

a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and
 a first diffraction grating on an outer surface of the first stack; and a second layer of material on a reverse face of the diamond layer.

13. An apparatus comprising:

a thin optically flat first layer of material;

a diamond layer on the first layer of material;

a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and
 a first diffraction grating on an outer surface of the first stack, wherein the first layer of material is silicon, the apparatus further comprising:

a thin optically flat second silicon layer on a reverse face of the diamond layer; and a second stack on a reverse face of the optically flat second silicon layer on the reverse face of the diamond layer, wherein the second stack includes a plurality of pairs of dielectric layers, wherein each pair of the plurality of pairs of dielectric layers of the second stack includes a first layer that has a first index of refraction value and a second layer that has a second index of refraction value that is different than the first index of refraction value.

14. An apparatus comprising:

a thin optically flat first layer of material;

a diamond layer on the first layer of material; and a first layered structure on the first layer of material, wherein the first layered structure includes:
 a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and a first diffraction grating on an outer surface of the first stack, wherein the diamond layer includes a ridge of diamond, and wherein a height of the ridge equals a thickness of the thin optically flat first layer of material.

15. An apparatus comprising:

a thin optically flat first layer of material;

a diamond layer on the first layer of material; and a first layered structure on the first layer of material, wherein the first layered structure includes:

a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and a first diffraction grating on an outer surface of the first stack, wherein the first layer of material is silicon, the apparatus further comprising:

an array of silicon pillars on a reverse face of the thin optically flat first silicon layer, wherein the array of silicon pillars extend through a thickness of the diamond layer; and a second silicon layer on a reverse face of the diamond layer, wherein at least some of the array of silicon pillars and at least a portion the second silicon layer are a single-crystal structure.

16. An apparatus comprising:

a thin optically flat first layer of material;

a diamond layer on the first layer of material; and a first layered structure on the first layer of material, wherein the first layered structure includes:

a first stack on the first layer of material, wherein the first stack includes a plurality of pairs of dielectric layers on the thin layer of flattened material, wherein each pair of the plurality of pairs of dielectric layers includes a first layer that has a first index of refraction value and a second layer that has a second index of refraction value that is different than the first index of refraction value, and a first diffraction grating on an outer surface of the first stack, wherein the first layer of material is silicon, the apparatus further comprising:

a plurality of silicon walls on a reverse face of the thin optically flat first silicon layer, wherein the plurality of silicon walls extend through a thickness of the diamond layer; and a second silicon layer on a reverse face of the diamond layer, wherein at least some of the plurality of silicon walls and at least a portion the second silicon layer are a single-crystal structure.

17. An apparatus for fabricating a grating on a silicon substrate, the apparatus comprising:

means for growing a diamond layer on the substrate;

means for removing most of the silicon substrate and means for flattening an obverse face of the substrate to leave a very thin layer of flattened material on the diamond layer;

means for depositing a stack on the diamond layer, wherein the stack includes a plurality of pairs of dielectric layers on the thin layer of flattened material, wherein each pair of the plurality of pairs of dielectric layers includes a first layer having a first index of refraction value and a second layer having a second index of refraction value that is different than the first index of refraction value; and means for forming a diffraction grating on an outer surface of the stack.

18. The apparatus of claim 17, further comprising:

means for pre-warping the first structure;

means for depositing a second structure having at least one layer on a reverse face of the pre-warped first structure; and means for depositing a temperature-change element on the second structure.

19. The method of claim 1, wherein the depositing of the second structure on the reverse face of the diamond layer is performed before the depositing of the first stack on the flattened obverse face of the first thin layer of flattened material on the obverse face of the diamond layer and the forming of the first diffraction grating.

20. The apparatus of claim 12, wherein the second structure provides a warp compensation for differences in coefficients of thermal expansion between the diamond layer and the first layer of material.

* * * * *